United States Patent
Yamashita et al.

(10) Patent No.: US 6,569,234 B2
(45) Date of Patent: May 27, 2003

(54) CEMENT DISPERSANT AND CEMENT COMPOSITION COMPRISING THIS

(75) Inventors: Akihiko Yamashita, Ibaraki (JP); Hiromichi Tanaka, Toyonaka (JP); Masaya Yamamoto, Yokohama (JP); Toru Uno, Yokohama (JP); Yoshiyuki Onda, Toshima-ku (JP); Tsuyoshi Hirata, Kobe (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/925,863

(22) Filed: Aug. 9, 2001

(65) Prior Publication Data
US 2002/0050232 A1 May 2, 2002

(30) Foreign Application Priority Data

Aug. 11, 2000 (JP) .................................. 2000-245167
Aug. 11, 2000 (JP) .................................. 2000-245168

(51) Int. Cl.$^7$ ................................................ C04B 11/28
(52) U.S. Cl. ..................... 106/696; 106/724; 106/728; 106/823; 524/5
(58) Field of Search ................. 106/696, 724, 106/728, 823; 524/5

(56) References Cited

U.S. PATENT DOCUMENTS

| 4,471,100 | A | | 9/1984 | Tsubakimoto et al. |
| 4,946,904 | A | * | 8/1990 | Akimoto et al. |
| 5,142,036 | A | * | 8/1992 | Akimoto et al. |
| 5,362,829 | A | | 11/1994 | Kinoshita et al. |
| 5,661,206 | A | | 8/1997 | Tanaka et al. |
| 5,798,425 | A | | 8/1998 | Albrecht et al. |
| 6,264,739 | B1 | | 7/2001 | Yamato et al. |

FOREIGN PATENT DOCUMENTS

| EP | 0 056 627 A2 | 7/1982 |
| EP | 1 061 089 A1 | 12/2000 |
| EP | 1 103 570 A2 | 5/2001 |
| EP | 1 138 696 A1 | 10/2001 |
| GB | 2 280 180 A | 1/1995 |
| JP | 56-81320 A | 7/1981 |
| JP | 57-118058 A | 7/1982 |
| JP | 7-53249 A | 2/1995 |
| JP | 8-283350 A | 10/1996 |
| JP | 9-142905 A | 6/1997 |
| JP | 10-194808 A | 7/1998 |
| JP | 10-273351 A | 10/1998 |
| JP | 11-106247 A | 4/1999 |
| JP | 2000-233957 A | 8/2000 |
| JP | 2000-351820 A | 12/2000 |
| WO | WO 00/48961 A1 | 8/2000 |
| WO | WO 00/77058 A1 | 12/2000 |
| WO | WO 01/14438 A1 | 3/2001 |

* cited by examiner

*Primary Examiner*—Paul Marcantoni
(74) *Attorney, Agent, or Firm*—Haugen Law Firm PLLC

(57) ABSTRACT

A cement dispersant which displays high dispersibility with a small addition amount and excellent dispersibility particularly even in a high water-reducing ratio area, and a cement composition comprising this. A first cement dispersant includes a copolymer having a first constitutional unit derived from an unsaturated (poly)alkylene glycol ether monomer; and a second constitutional unit derived from an unsaturated monocarboxylic acid monomer, wherein the second constitutional unit includes at least one structure derived from an acrylic acid (salt).

23 Claims, No Drawings

CEMENT DISPERSANT AND CEMENT COMPOSITION COMPRISING THIS

BACKGROUND OF THE INVENTION

A. Technical Field

The present invention relates to a cement dispersant and a cement composition comprising this.

B. Background Art

In the recent concrete industry, the improvement of durability and strength of concrete structures is strongly desired, and the reduction of the amount of unit water is an important object for achieving this.

Until now, the use of various cement dispersants has been proposed in order to reduce the amount of unit water. Among the various cement dispersants, polycarboxylic acid-based cement dispersants are especially preferable because they display higher water-reducing capacity than other cement dispersants such as naphthalene-based ones. For example, JP-A-91320/1981 proposes copolymers as produced by using polyethylene glycol monoallyl ether and a (meth) acrylic acid monomer in a specific ratio. However, the capacity of this cement dispersant is still insufficient. In addition, JP-A-118058/1982, JP-A-283350/1996, and JP-A-142905/1997 propose cement dispersants comprising copolymers as produced by using polyethylene glycol monoallyl ether and a maleic acid-based monomer in a specific ratio. However, these cement dispersants are not in a level that can satisfy dispersibility particularly in a high water-reducing ratio area because of the problem that the copolymerizability is low between the polyethylene glycol monoallyl ether and the maleic acid-based monomer. On the other hand, JP-A-194808/1998 proposes cement dispersants comprising copolymers as produced by using polypropylene glycol polyethylene glycol mono(meth)allyl ether and an unsaturated carboxylic acid monomer. However, because the polypropylene glycol chain having high hydrophobicity accounts for higher ratio, the dispersants have low dispersibility, a large amount of the dispersant is necessary to obtain sufficient dispersibility. The dispersant having a level that can satisfy the dispersibility particularly in a high water-reducing ratio area has not been obtained in the existing circumstances.

Furthermore, it is costly to produce these conventional polycarboxylic acid-base cement dispersants. Therefore, there is a problem that the cost of concrete itself rises.

SUMMARY OF THE INVENTION

A. Object of the Invention

Accordingly, an object of the present invention is to provide: a cement dispersant which displays high dispersibility with a small addition amount and excellent dispersibility particularly even in a high water-reducing ratio area, and a cement composition comprising this.

B. Disclosure of the Invention

The present inventors diligently studied and, as a result, found that a specific copolymer displays high dispersibility with a small addition amount and is useful as a cement dispersant which is inexpensive and excellent in capacities. The specific copolymer is obtained by copolymerizing an unsaturated (poly)alkylene glycol ether monomer with an unsaturated monocarboxylic acid monomer including a (meth)acrylic acid (salt) as an essential component in a specific ratio of the entirety of the comonomers, wherein: the unsaturated (poly)alkylene glycol ether monomer includes an oxyethylene group as an oxyalkylene group in a specific amount at least; the oxyalkylene group has an average addition number of moles in a specific range; and the number of carbon atoms included in the terminal unsaturated group is in a specific range. Then, they completed the present invention on the basis of these findings.

That is to say, a first cement dispersant, according to the present invention, comprises a copolymer including: constitutional unit (I-1) derived from unsaturated (poly)alkylene glycol ether monomer (a1) as represented in general formula (1) below; and constitutional unit (II-1) derived from unsaturated monocarboxylic acid monomer (b1) as represented in general formula (2) below, as an essential component, wherein constitutional unit (II-1) includes at least one structure derived from an acrylic acid (salt), wherein general formula (1) is:

where: X represents an alkenyl group having 4 carbon atoms; $R^1O$ represents a mixture of one or more of an oxyalkylene group having 2 to 18 carbon atoms, and an oxyethylene group accounts for not less than 90 mol % of the entirety of the oxyalkylene groups; and n is an average addition number of moles and represents 1 to 300; and wherein general formula (2) is:

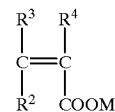

where: $R^2$, $R^3$, and $R^4$ each independently represent hydrogen or a methyl group; and M represents hydrogen, a monovalent metal, a divalent metal, an ammonium group, or an organic amine group.

A second cement dispersant, according to the present invention, comprises a copolymer including: constitutional unit (I-1) derived from unsaturated (poly)alkylene glycol ether monomer (a-1) as represented in general formula (1) below; and constitutional unit (II-2) derived from unsaturated monocarboxylic acid monomer (b2) as represented in general formula (3) below, as an essential component, and is characterized in that constitutional unit (II-2) includes at least one structure derived from a methacrylic acid (salt), and that the milliequivalent of carboxyl groups in the copolymer is not more than 3.30 meq per 1 g of the copolymer when all the carboxyl groups are changed into their unneutralized form, wherein general formula (1) is:

where: X represents an alkenyl group having 4 carbon atoms; $R^1O$ represents a mixture of one or more of an oxyalkylene group having 2 to 18 carbon atoms, and an oxyethylene group accounts for not less than 90 mol % of the entirety of the oxyalkylene groups; and n is an average addition number of moles and represents 1 to 300; and wherein general formula (3) is:

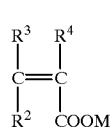
(3)

where: $R^2$, $R^3$, and $R^4$ each independently represent hydrogen or a methyl group; and M represents hydrogen, a monovalent metal, a divalent metal, an ammonium group, or an organic amine group.

A third cement dispersant, according to the present invention, comprises a copolymer including: constitutional unit (I-2) derived from unsaturated polyalkylene glycol ether monomer (a2) as represented in general formula (4) below; and constitutional unit (II-1) derived from unsaturated monocarboxylic acid monomer (b1) as represented in general formula (2) below, as an essential component, wherein constitutional unit (II-1) accounts for not more than 50 weight % of the entirety of the constitutional units, and includes at least one structure derived from an acrylic acid (salt), wherein general formula (4) is:

$$YO(R^1O)_mH \quad (4)$$

where: Y represents an alkenyl group having 2 or 3 carbon atoms; $R^1O$ represents a mixture of one or more of an oxyalkylene group having 2 to 18 carbon atoms, and an oxyethylene group accounts for not less than 90 mol % of the entirety of the oxyalkylene groups; and m is an average addition number of moles and represents 40 to 300; and wherein general formula (2) is:

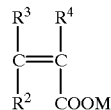
(2)

where: $R^2$, $R^3$, and $R^4$ each independently represent hydrogen or a methyl group; and M represents hydrogen, a monovalent metal, a divalent metal, an ammonium group, or an organic amine group.

A fourth cement dispersant, according to the present invention, comprises a copolymer including: constitutional unit (I-2) derived from unsaturated polyalkylene glycol ether monomer (a2) as represented in general formula (4) below; and constitutional unit (II-2) derived from unsaturated monocarboxylic acid monomer (b2) as represented in general formula (3) below, as an essential component, wherein constitutional unit (II-2) accounts for not more than 50 weight % of the entirety of the constitutional units, and includes at least one structure derived from a methacrylic acid (salt), wherein general formula (4) is:

$$YO(R^1O)_mH \quad (4)$$

where: Y represents an alkenyl group having 2 or 3 carbon atoms; $R^1O$ represents a mixture of one or more of an oxyalkylene group having 2 to 18 carbon atoms, and an oxyethylene group accounts for not less than 90 mol % of the entirety of the oxyalkylene groups; and m is an average addition number of moles and represents 40 to 300; and wherein general formula (3) is:

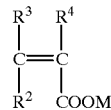
(3)

where: $R^2$, $R^3$, and $R^4$ each independently represent hydrogen or a methyl group; and M represents hydrogen, a monovalent metal, a divalent metal, an ammonium group, or an organic amine group.

A cement composition, according to the present invention, comprises the cement dispersant according to the present invention, cement, and water as essential components.

These and other objects and the advantages of the present invention will be more fully apparent from the following detailed disclosure.

DETAILED DESCRIPTION OF THE INVENTION

The first cement dispersant, according to the present invention, comprises copolymer (i) including: constitutional unit (I-1) derived from unsaturated (poly)alkylene glycol ether monomer (a1) as represented in the above general formula (1); and constitutional unit (II-1) derived from unsaturated monocarboxylic acid monomer (b1) as represented in the above general formula (2), as an essential component. In addition, the second cement dispersant, according to the present invention, comprises copolymer (ii) including: constitutional unit (I-1); and constitutional unit (II-2) derived from unsaturated monocarboxylic acid monomer (b2) as represented in the above general formula (3), as an essential component. In addition, the third cement dispersant, according to the present invention, comprises copolymer (iii) including: constitutional unit (I-2) derived from unsaturated polyalkylene glycol ether monomer (a2) as represented in the above general formula (4); and constitutional unit (II-1), as an essential component. In addition, the fourth cement dispersant, according to the present invention, comprises copolymer (iv) including constitutional unit (I-2) and constitutional unit (II-2) as an essential component. Incidentally, copolymers (i) to (iv) may comprise constitutional unit (III) derived from monomer (c) below respectively.

It is important that the oxyalkylene group ($R^1O$) as represented in the above general formulas (1) and (4) includes the oxyethylene group of at least 90 mol %, preferably not less than 95 mole %. Accordingly, the hydrophilicity-hydrophobicity balance is maintained and the excellent dispersibility can be displayed. In case where the oxyethylene group accounts for less than 90 mol % of the entirety of the oxyalkylene groups ($R^1O$), the dispersibility cannot sufficiently be displayed.

The number of the carbon atoms of the oxyalkylene group ($R^1O$) as represented in the above general formulas (1) and (4) is fitly in the range of 2 to 18, preferably 2 to 8, more preferably 2 to 4. The constitutional units of each $R^1O$ may be identical or different. If the oxyalkylene group ($R^1O$) includes an oxyethylene group which accounts for not less than 90 mol % of the entirety of the oxyalkylene groups, the oxyalkylene group ($R^1O$) is in a state of mixing an oxyalkylene group other than the oxyethylene group. In this case, examples of the oxyalkylene group other than the oxyethylene group include: an oxypropylene group, an oxybutylene group, and an oxystyrene group. Incidentally, when $R^1O$ is in a state of a mixture of two or more kinds, the constitutional units of each $R^1O$ may be in any addition state, such as block addition, random addition, or alternating addition.

It is important that the average addition number n of moles of the oxyalkylene group in the above general formula (1) is in the range of 1 to 300, more preferably 10 to 300, still more preferably 20 to 300, particularly preferably 30 to 300, most preferably 40 to 200. In case where this average addition number of moles is less, the hydrophilicity of the copolymer as obtained is lowered and the dispersibility tends to be lowered. On the other hand, in case where the average addition number of moles is more than 300, the copolymerizability is lowered.

The number of the carbon atoms of the alkenyl group represented by X in the above general formula (1) is 4. Examples thereof include a methallyl group and a 3-butenyl group, and the methallyl group is particularly preferable.

Examples of unsaturated (poly)alkylene glycol ether monomer (a1) as represented in the above general formula (1) include (poly)alkylene glycol methallyl ethers, and more particularly, compounds obtained by adding 1 to 300 moles alkylene oxides to unsaturated alcohols having 4 carbon atoms such as methallyl alcohol. These can be used either alone respectively or in combinations with each other.

It is important that the average addition number m of moles of the oxyalkylene group in the above general formula (4) is in the range of 40 to 300, more preferably 50 to 300, still more preferably 60 to 300, particularly preferably 60 to 200. In case where this average addition number of moles is less than 40, the hydrophilicity of the copolymer as obtained is lowered and the dispersibility cannot sufficiently be displayed. On the other hand, in case where the average addition number of moles is more than 300, the copolymerizability is lowered.

The number of the carbon atoms of the alkenyl group represented by Y in the above general formula (4) is 2 or 3, preferably 3. As to the alkenyl group having 3 carbon atoms, an allyl group is particularly preferable.

Examples of unsaturated polyalkylene glycol ether monomer (a2) as represented in the above general formula (4) include polyalkylene glycol vinyl ethers and polyalkylene glycol allyl ethers, and more particularly, compounds obtained by adding 40 to 300 moles alkylene oxides to unsaturated alcohols such as allyl alcohol. These can be used either alone respectively or in combinations with each other.

The content of constitutional unit (I-1) as derived from unsaturated (poly)alkylene glycol ether monomer (a1) in copolymers (i) and (ii), or the content of constitutional unit (I-2) as derived from unsaturated polyalkylene glycol ether monomer (a2) in copolymers (iii) and (iv) each is preferably not less than 1 weight %, more preferably not less than 10 weight %, still more preferably not less than 20 weight %, particularly preferably not less than 30 weight %, most preferably not less than 45 weight %, of the entirety of the constitutional units. In case where the content of constitutional unit (I-1) or constitutional unit (I-2) is less than 1 weight %, the dispersibility to cement tends to be lowered.

In addition, the content of constitutional unit (I-1) as derived from unsaturated (poly)alkylene glycol ether monomer (a1) in copolymers (i) and (ii), or the content of constitutional unit (I-2) as derived from unsaturated polyalkylene glycol ether monomer (a2) in copolymers (iii) and (iv) each is preferably not more than 50 mol % of the entirety of the constitutional units. In particular, the content of constitutional unit (I-1) in copolymers (i) and (ii) is preferably in the above range, more preferably in the range of 1 to 50 mol %, still more preferably 2 to 50 mol %, particularly preferably 3 to 45 mol %, most preferably 4 to 45 mol %. In case where the content of the constitutional unit (I-1) is more than 50 mol %, the dispersibility to cement tends to be lowered.

It is important that constitutional unit (II-1) in copolymers (i) and (iii) includes at least one structure derived from an acrylic acid (salt). It is essential that unsaturated monocarboxylic acid monomer (b1) as represented in the above general formula (2) includes acrylic acid or its salt. The copolymer as obtained can display excellent dispersibility with a small amount because of including the structure derived from the acrylic acid or its salt.

It is important that constitutional unit (II-2) in copolymers (ii) and (iv) includes at least one structure derived from a methacrylic acid (salt). It is essential that unsaturated monocarboxylic acid monomer (b2) as represented in the above general formula (3) includes methacrylic acid or its salt. The copolymer as obtained can display excellent dispersibility with a small amount because of including the structure derived from the methacrylic acid or its salt.

The occupying ratio of the structure derived from the acrylic acid (salt) as essentially included in constitutional unit (II-1) of copolymers (i) and (iii), or the occupying ratio of the structure derived from the methacrylic acid (salt) as essentially included in constitutional unit (II-2) of copolymers (ii) and (iv) each is preferably not less than 1 weight %, more preferably not less than 2 weight %, still more preferably not less than 3 weight %, particularly preferably not less than 4 weight %, of the entirety of the constitutional units of each copolymer. Incidentally, the upper limit of the occupying ratio of the structure derived from the acrylic acid (salt) or the occupying ratio of the structure derived from the methacrylic acid (salt) is preferably equal to the upper limit of the content of constitutional unit (II-1) or constitutional unit (II-2), as is mentioned below. Incidentally, examples of the acrylic or methacrylic acid salt include monovalent metal salts, divalent metal salts, ammonium salts, and organic amine salts.

Examples of unsaturated monocarboxylic acid monomer (b1) other than the acrylic acid and its salt in the above general formula (2), and unsaturated monocarboxylic acid monomer (b2) other than the methacrylic acid and its salt in the above general formula (3) include: methacrylic acid (as monomer (b1)), acrylic acid (as monomer (b2)), crotonic acid, and their monovalent metal salts, divalent metal salts, ammonium salts, and organic amine salts. These can be used either alone respectively or in combinations with each other. Among these, the methacrylic acid (salt) is particularly preferable as monomer (b1), and the acrylic acid (salt) is particularly preferable as monomer (b2). The mode involving the methacrylic acid (salt) and acrylic acid (salt) as unsaturated monocarboxylic acid monomer (b1) or (b2) is one of preferred modes for carrying out the present invention.

It is important that the content of constitutional unit (II-1) as derived from unsaturated monocarboxylic acid monomer (b1) in the above copolymer (iii), or the content of constitutional unit (II-2) as derived from unsaturated monocarboxylic acid monomer (b2) in the above copolymer (iv) each is not more than 50 weight %, preferably not more than 40 weight %, more preferably not more than 35 weight %, still more preferably not more than 30 weight %, particularly preferably not more than 25 weight %, of the entirety of the constitutional units.

On the other hand, the content of constitutional unit (II-1) as derived from unsaturated monocarboxylic acid monomer (b1) in the above copolymer (i) is also preferably not more than 50 weight %, more preferably not more than 40 weight %, still more preferably not more than 35 weight %, particularly preferably not more than 30 weight %, most preferably not more than 25 weight %, of the entirety of the constitutional units.

On the other hand, the content of constitutional unit (II-2) as derived from unsaturated monocarboxylic acid monomer (b2) in the above copolymer (ii) may be determined so that the milliequivalent of carboxyl groups in the copolymer would be adjusted in the following range when all the carboxyl groups are converted into their unneutralized form. Incidentally, as is mentioned below, the copolymer (ii) may include, for example, a constitutional unit having a carboxyl group as derived from an unsaturated dicarboxylic acid monomer, as constitutional unit (III) as derived from copolymerizable monomer (c). Therefore, the milliequivalent of carboxyl groups is not always derived from the above constitutional unit (II-2), and it is necessary to determine the upper limit of the content of the above constitutional unit (II-2) in consideration of this matter.

In addition, the content of constitutional unit (II-1) as derived from unsaturated monocarboxylic acid monomer (b1) or the content of constitutional unit (II-2) as derived from unsaturated monocarboxylic acid monomer (b2) in the above copolymers (i) to (iv) each is preferably not less than 1 weight %, more preferably not less than 2 weight %, still more preferably not less than 3 weight %, particularly preferably not less than 4 weight %, of the entirety of the constitutional units.

The above copolymers (i) to (iv) may include constitutional unit (III) derived from copolymerizable monomer (c) with monomer (a1), (a2), (b1), or (b2), in addition to the above constitutional unit (I-1), (II-2), (II-1), or (II-2). Examples of monomer (c) include: unsaturated dicarboxylic acid monomers, such as maleic acid, maleic anhydride, fumaric acid, itaconic acid, and citraconic acid, and their monovalent metal salts, divalent metal salts, ammonium salts, and organic amine salts; half esters and diesters of the above-mentioned unsaturated dicarboxylic acid monomers with alcohols having 1 to 30 carbon atoms; half amides and diamides of the above-mentioned unsaturated dicarboxylic acid monomers with amines having 1 to 30 carbon atoms; half esters and diesters of the above-mentioned unsaturated dicarboxylic acid monomers with alkyl (poly)alkylene glycols as obtained by adding 1 to 500 mols of alkylene oxides with 2 to 18 carbon atoms to the above-mentioned alcohols or amines; half esters and diesters of the above-mentioned unsaturated dicarboxylic acid monomers with glycols having 2 to 18 carbon atoms or with polyalkylene glycols of 2 to 500 in molar number of addition of the foregoing glycols; esters of unsaturated monocarboxylic acids with alcohols having 1 to 30 carbon atoms, such as methyl (meth)acrylate, ethyl (meth)acrylate, propyl (meth)acrylate, glycidyl (meth) acrylate, methyl crotonate, ethyl crotonate, and propyl crotonate; esters of unsaturated monocarboxylic acids such as (meth)acrylic acid with alkoxy (poly)alkylene glycols as obtained by adding 1 to 500 mols of alkylene oxides with 2 to 18 carbon atoms to alcohols having 1 to 30 carbon atoms; adducts of 1 to 500 mols of alkylene oxides with 2 to 18 carbon atoms to the unsaturated monocarboxylic acids such as (meth)acrylic acid, such as poly)ethylene glycol monomethacrylate, (poly)propylene glycol monomethacrylate and (poly)butylene glycol monomethacrylate; half amides of maleamic acid with glycols having 2 to 18 carbon atoms or polyalkylene glycols of 2 to 500 in molar number of addition of the foregoing glycols; (poly)alkylene glycol di(meth)acrylates such as triethylene glycol di(meth)acrylate, (poly)ethylene glycol di(meth)acrylate, polypropylene glycol di(meth)acrylate, and poly)ethylene glycol (poly)propylene glycol di(meth)acrylate; multifunctional (meth)acrylates such as hexanediol di(meth)acrylate, trimethylolpropane tri(meth)acrylate, and trimethylolpropane di(meth)acrylate; (poly)alkylene glycol dimaleates such as triethylene glycol dimaleate and polyethylene glycol dimaleate; unsaturated sulfonic acids, such as vinylsulfonate, (meth)allylsulfonate, 2-(meth) acryloxyethylsulfonate, 3-(meth)acryloxypropylsulfonate, 3-(meth)acryloxy-2-hydroxypropylsulfonate, 3-(meth) acryloxy-2-hydroxypropylsulfophenyl ether, 3-(meth) acryloxy-2-hydroxypropyloxysulfobenzoate, 4-(meth) acryloxybutylsulfonate, (meth)acrylamidomethylsulfonic acid, (meth)acrylamidoethylsulfonic acid, 2-methylpropanesulfonic acid (meth)acrylamide, and styrenesulfonic acid, and their monovalent metal salts, divalent metal salts, ammonium salts, and organic amine salts; amides of the unsaturated monocarboxylic acids with amines having 1 to 30 carbon atoms, such as methyl(meth)acrylamide; vinyl aromatic compounds such as styrene, α-methylstyrene, vinyltoluene, and p-methylstyrene; alkanediol mono(meth)acrylates such as 1,4-butanediol mono(meth)acrylate, 1,5-pentanediol mono(meth)acrylate, and 1,6-hexanediol mono(meth)acrylate; dienes such as butadiene, isoprene, 2-methyl-1,3-butadiene, and 2-chloro-1,3-butadiene; unsaturated amides such as (meth) acrylamide, (meth)acrylalkylamide, N-methylol(meth) acrylamide, and N,N-dimethyl(meth)acrylamide; unsaturated cyanes such as (meth)acrylonitrile and a-chloroacrylonitrile; unsaturated esters such as vinyl acetate and vinyl propionate; unsaturated amines such as aminoethyl (meth)acrylate, methylaminoethyl (meth) acrylate, dimethylaminoethyl (meth)acrylate, dimethylaminopropyl (meth)acrylate, dibutylaminoethyl (meth)acrylate, and vinylpyridine; divinyl aromatic compounds such as divinylbenzene; cyanurates such as triallyl cyanurate; allyl compounds such as (meth)allyl alcohol and glycidyl (meth) allyl ether, and siloxane derivatives such as polydimethylsiloxanepropylaminomaleamic acid, polydimethylsiloxaneaminopropyleneaminomaleamic acid, polydimethylsiloxanebis(propylaminomaleamic acid), polydimethylsiloxanebis(dipropyleneaminomaleamic acid), polydimethylsiloxane-(1-propyl-3-acrylate), polydimethylsiloxane-(1-propyl-3-methacrylate), polydimethylsiloxane-bis-(1-propyl-3-acrylate), and polydimethylsiloxane-bis-(1-propyl-3-methacrylate). These may be used either alone respectively or in combinations of each other. Particularly, the unsaturated dicarboxylic acid monomer such as maleic acid is preferable as monomer (c) having a carboxyl group other than unsaturated monocarboxylic acid monomers (b1) and (b2).

The content of constitutional unit (III) as derived from copolymerizable monomer (c) in the above copolymers (i) to (iv) is not especially limited if the effects of the present invention are not damaged. The content thereof is preferably not more than 70 weight %, more preferably not more than 60 weight %, still more preferably not more than 50 weight %, particularly preferably not more than 40 weight %, most preferably not more than 30 weight %, of the entirety of the constitutional units.

The ratio between the respective constitutional units composing the above copolymers (i) to (iv) is, for example, preferably in the range of (1 to 99)/(1 to 30)/(0 to 70) (weight %) as constitutional unit (I-1) or (I-2)/constitutional unit (II-1) or (II-2)/constitutional unit (III), but such a ratio is more preferably in the range of (10 to 99)/(1 to 30)/(0 to 60) (weight %), still more preferably in the range of (20 to 98)/(2 to 30)/(0 to 50) (weight %), particularly preferably in the range of (30 to 97)/(3 to 30)/(0 to 40) (weight %), most preferably in the range of (45 to 96)/(4 to 25)/(0 to 30) (weight %), (wherein the entirety of constitutional unit (I-1) or (I-2), constitutional unit (II-1) or (II-2) and constitutional unit (III) is 100 weight %).

In the above copolymer (ii), it is important that the milliequivalent of carboxyl groups in the copolymer is not more than 3.30 meq per 1 g of the copolymer when all the carboxyl groups are converted into their unneutralized form. The content is preferably in the range of 0.10 to 3.30 meq/g, more preferably 0.15 to 3.00 meq/g, still more preferably 0.20 to 2.50 meq/g, particularly preferably 0.30 to 2.50 meq/g. In case where this milliequivalent of carboxyl groups is more than 3.3 meq/g, the fluidity is lowered with the passage of time when producing its cement composition. On the other hand, in case where the milliequivalent of carboxyl groups is too small, the dispersibility of the copolymer is extremely lowered, and the fluidity is not obtained sufficiently as a cement composition.

On the other hand, even in the above copolymers (i), (iii) and (iv), the milliequivalent of carboxyl groups in the copolymer is preferably not more than 3.30 meq per 1 g of the copolymer when all the carboxyl groups are converted into their unneutralized form. The milliequivalent is more preferably in the range of 0.10 to 3.30 meq/g, still more preferably 0.15 to 3.00 meq/g, particularly preferably 0.20 to 2.50 meq/g, most preferably 0.30 to 2.50 meq/g.

Incidentally, when all the carboxyl groups in the above copolymer each are converted into their unneutralized form, the milliequivalent of carboxyl groups can be calculated in the following way. For example, when using methacrylic acid as monomer (b2) in copolymer (ii) and carrying out a copolymerization with the weight ratio of 90/10 (weight %) as monomer (a1)/monomer (b2), the milliequivalent of carboxyl groups per 1 g of the copolymer is calculated below because the molecular weight of methacrylic acid is 86.

$(0.1/86) \times 1000 = 1.16$ (meq/g)  (Calculation Example 1)

In addition, for example, when using sodium methacrylate as monomer (b2) in copolymer (ii) and carrying out a copolymerization with the weight ratio of 90/10 (weight %) as monomer (a1)/monomer (b2), the milliequivalent of carboxyl groups per 1 g of the copolymer is calculated below because the molecular weights of sodium methacrylate and methacrylic acid is 108 and 86 respectively.

$(0.1/108)/(0.9+0.1 \times 86/108) \times 1000 = 0.95$ (meq/g)  (Calculation Example 2)

Incidentally, when using methacrylic acid at the polymerization and neutralizing carboxylic groups derived from the methacrylic acid with sodium hydroxide after the polymerization, the milliequivalent of carboxyl group can be calculated in the same way as of Calculation Example 2. In addition, for example, when using sodium methacrylate and sodium acrylate as monomer (b2) in copolymer (ii) and carrying out a copolymerization with the weight ratio of 90/5/5 (weight %) as monomer (a1)/sodium methacrylate/sodium acrylate, the milliequivalent of carboxyl groups per 1 g of the copolymer is calculated below because the molecular weights of methacrylic acid, acrylic acid, sodium methacrylate, and sodium acrylic acid are 86, 108, 72, and 94 respectively.

$(0.05/108+0.05/94)/(0.9+0.05 \times 86/108+0.05 \times 72/94) \times 1000 = 1.02$ (meq/g)  (Calculation Example 3)

The weight-average molecular weight of the above copolymers (i) to (iv) is fitly in the range of 10,000 to 300,000 in terms of polyethylene glycol by gel permeation chromatography (hereinafter, referred as "GPC"), preferably 10,000 to 100,000, more preferably 10,000 to 80,000, still more preferably 10,000 to 70,000. The dispersant which displays higher dispersibility can be obtained by selecting the above range of the weight-average molecular weight.

The above copolymers (i) to (iv) which are essential components for the cement dispersant according to the present invention, for example, can easily be obtained by copolymerizing the comonomers including the above (poly) alkylene glycol ether monomer (a1) or (a2), the above unsaturated monocarboxylic acid monomer (b1) or (b2), and the above monomer (c) if necessary, in the presence of a polymerization initiator, but its production process is not especially limited to this. For example, copolymers (i) to (iv) can also be obtained by a process of: copolymerizing a monomer before adding an alkylene oxide instead of monomer (a1) or (a2) (namely, an unsaturated alcohol such as allyl alcohol), and monomer (b1) or (b2) in the presence of a polymerization initiator (if necessary, other copolymerizable monomer (c) may be further copolymerized with these monomers.); and thereafter, reacting with an alkylene oxide.

The ratio between the respective comonomers as used for producing the copolymer is, for example, fitly in the range of (1 to 99)/(1 to 30)1(0 to 70) (weight %) as monomer (a1) or (a2)/monomer (b1) or (b2)/monomer (c), preferably in the range of (10 to 99)/(1 to 30)/(0 to 60) (weight %), more preferably in the range of (20 to 98)/(2 to 30)/(0 to 50) (weight %), particularly preferably in the range of (30 to 97)/(3 to 30)/(0 to 40) (weight %), most preferably in the range of (45 to 96)/(4 to 25)/(0 to 30) (weight %), (wherein the entirety of monomer (a1) or (a2), monomer (b1) or (b2), and monomer (c) is 100 weight %).

The copolymerization for obtaining the above copolymers (i) to (iv) can be carried out by conventional methods such as solution polymerization or bulk polymerization. The solution polymerization can be carried out in a batchwise or continuous manner. Examples of a solvent as used in such a case include water; alcohols such as methyl alcohol, ethyl alcohol, and isopropyl alcohol; aromatic or aliphatic hydrocarbons such as benzene, toluene, xylene, cyclohexane, and n-hexane; ester compounds, such as ethyl acetate; ketone compounds such as acetone and methyl ethyl ketone; and cyclic ethers such as tetrahydrofuran and dioxane. However, it is preferable to use at least one kind selected from the group consisting of water and lower alcohols having 1 to 4 carbon atoms because of the solubility of the raw monomers and the copolymer as obtained. Among these, water is more preferable because the solvent-removing process can be omitted.

When carrying out an aqueous polymerization, an aqueous polymerization initiator can be used as the radical polymerization initiator. Examples thereof include: persulfate salts such as ammonium persulfate, sodium persulfate and potassium persulfate; hydrogen peroxide; aqueous azo initiators such as azo amidine compounds (for example, 2,2'-azobis-2-methylpropionamidine hydrochloride), cyclic azo amidine compounds (for example, 2,2'-azobis-2-(2-imidazolin-2-yl)propane hydrochloride), and azonitriles (for example, 2-carbamoyl azoisobutyronitrile). In this case, promoters can be used jointly, and examples thereof include: alkali metal hydrogensulfites such as sodium hydrogensulfite, sodium metabisulfite, sodium hypophosphite, Fe (II) salts such as Mohr's salts, sodium hydroxymethanesulfite dihydrate, hydroxylamine hydrochloride, thiourea, L-ascorbic acid (salt), and isoascorbic acid (salt). Among these, the combination of hydrogen peroxide and the promoters such as L-ascorbic acid (salt) is preferable.

In addition, when carrying out the solution polymerization in solvents such as aromatic or aliphatic hydrocarbons, ester compounds and ketone compounds, radical polymerization initiators such as peroxides (for example, benzoyl peroxide, lauroyl peroxide and sodium peroxide), hydroperoxides (for example, t-butyl hydroperoxide and cumene hydroperoxide), and azo compounds (for example, azobisisobutyronitrile). In this case, promoters such as amine compounds can be used jointly. In addition, when using a solvent mixture of water and lower alcohol, a radical polymerization initiator (and a promoter) can be selected suitably among the above various radical polymerization initiators and combinations of the radical polymerization initiators and the promoters, and used.

The bulk polymerization can be carried out by use of radical polymerization initiators such as peroxides (for example, benzoyl peroxide, lauroyl peroxide and sodium peroxide), hydroperoxides (for example, t-butyl hydroperoxide and cumene hydroperoxide), and azo compounds (for example, azobisisobutyronitrile).

When the copolymerization is carried out, the reaction temperature is not especially limited. However, when the persulfate salt is used as an initiator, the reaction temperature is, for example, fitly in the range of 40 to 90° C., preferably 42 to 85° C., more preferably 45 to 80° C. In addition, when the combination of hydrogen peroxide and L-ascorbic acid (salt) as a promoter is used as an initiator, the reaction temperature is, for example, fitly in the range of 30 to 90° C., preferably 35 to 85° C., more preferably 40 to 80° C.

When the copolymerization is carried out, the polymerization time is not especially limited. The polymerization time is, for example, fitly in the range of 0.5 to 10 hours, preferably 0.5 to 8 hours, more preferably 1 to 6 hours. In case where the polymerization time is longer or shorter than this range, there are disadvantages in that the polymerization ratio or the productivity is lowered.

When the copolymerization is carried out, the amount of the entirety of the comonomers as used is in the range of 30 to 90 weight %, preferably 40 to 93 weight %, more preferably 50 to 90 weight %, particularly preferably 60 to 90 weight %, of the entirety of raw materials including other raw materials. In case where the amount of the entirety of the comonomers as used is less than this range in particular, there are disadvantages in that the polymerization ratio or the productivity is lowered.

An addition method for the monomer each is not especially limited. The following methods may be employed: a method which comprises adding the entirety of the monomers into the reactor initially and collectively, a method which comprises adding the entirety of the monomers into the reactor divisionally or continuously, or a method which comprises adding a portion of the monomers into the reactor initially and adding the remaining portion thereof into the reactor divisionally or continuously. Incidentally, the radical polymerization initiator may be initially added to the reactor, or added dropwise to the reactor. In addition the combination of these may be carried out in accordance with purposes.

When the copolymerization is carried out, chain-transfer agents can be used in order to adjust the molecular weight of the copolymer as obtained. Especially, the chain-transfer agents are effectively used when using acrylic acid as the above unsaturated monocarboxylic acid monomer (b1) or (b2), and the chain-transfer agents are particularly effectively used when using the above unsaturated (poly)alkylene glycol ether monomer (a1) and using acrylic acid as the above unsaturated monocarboxylic acid monomer (b1) or (b2). Examples of the chain-transfer agents include thiol chain-transfer agents such as mercaptoethanol, thioglycerol, thioglycolic acid, 2-mercaptopropionic acid, 3-mercaptopropionic acid, thiomalic acid, octyl thioglycolate, octyl 3-mercaptopropionate and 2-mercaptoethanesulfonic acid. Two or more kinds of the chain-transfer agents can also be jointly used. In addition, it is effective to use a high chain-transferable monomer such as (meth)allyl sulfonic acid (salts) as monomer (c) in order to adjust the molecular weight of the copolymer.

It is important to continue the copolymerization reaction stably in order to obtain a copolymer having a predetermined molecular weight reproducibly. Therefore, when the solution polymerization is carried out, the concentration of dissolved oxygen in the solvent as used at 25° C. is preferably adjusted to not more than 5 ppm, more preferably in the range of 0.01 to 4 ppm, still more preferably 0.01 to 2 ppm, most preferably 0.01 to 1 ppm. Incidentally, when the replacement of nitrogen is carried out after adding a monomer to a solvent, the concentration of dissolved oxygen in the system including the monomer may be adjusted to the above range.

Incidentally, the adjustment of the concentration of the dissolved oxygen in the solvent may be carried out in the polymerization reactor, or a solvent of which dissolved oxygen amount is adjusted beforehand may be used. Examples of a method for removing oxygen in a solvent include the following methods (1) to (5):

(1) After packing an inert gas such as nitrogen into a sealed vessel including a solvent under compressed pressure, the pressure in the sealed vessel is lowered to lower the partial pressure of oxygen in the solvent. The pressure in the sealed vessel may be lowered in a stream of nitrogen.

(2) While the gas phase of a vessel including a solvent is replaced with an inert gas such as nitrogen, a liquid phase is vigorously stirred for a long time.

(3) An inert gas such as nitrogen bubbles in a solvent which is placed in a vessel for a long time.

(4) After a solvent is once boiled, it is cooled under an atmosphere of nitrogen.

(5) A static mixer is placed on the way of piping, and an inert gas such as nitrogen is mixed with a solvent in the piping for transporting the solvent to a polymerization reactor.

Copolymers (i) to (iv) as obtained in the above way may directly be used as a major component of the cement dispersant, even as they are. However, their pH is preferably adjusted to not lower than 5 in consideration of handling. The polymerization may be carried out in a pH of not lower than 5. However, the polymerization ratio is lowered. At the same time, the copolymerizability is deteriorated and the performance as a cement dispersant is lowered. Therefore, it is preferable that the copolymerization reaction is carried out in a pH of lower than 5, and the pH is adjust to not lower than 5 after the copolymerization. The adjustment of the pH can be carried out by using alkaline substances, such as inorganic salts (for example, hydroxides and carbonates of monovalent or divalent metals); ammonia; and organic amines. In addition, the concentration can be adjusted after completing the reaction if necessary. The above copolymers (i) to (iv) may be used alone in the form of an aqueous solution as a major component of the cement dispersant, or may be powdered and used by neutralizing the copolymer with hydroxides of a divalent metal such as calcium and magnesium to produce a multivalent metal salt thereof and drying thereafter, or by fixing the copolymer on inorganic powder such as silica fine powder and then drying.

The cement dispersant, according to the present invention, essentially comprises any one of the above copolymers (i) to (iv). The content of these copolymers (i) to (iv) is not especially limited in the cement dispersant according to the present invention. However, the content is preferably not less than 20 weight %, more preferably not less than 40 weight %, of the solid content, namely nonvolatile content in the dispersant.

The cement dispersant according to the present invention comprises a polyalkylene glycol preferably in the range of 1 to 50 weight %, more preferably 2 to 50 weight %, still more preferably 2 to 40 weight %, particularly preferably 3 to 30 weight %, of the copolymer, in addition to the above copolymers (i) to (iv). When the cement dispersant further comprises the polyalkylene glycol, the dispersant can improve workability of mortar or concrete furthermore. In case where the content of the polyalkylene glycol is less than 1 weight %, the effects of improving workability of mortar or concrete are not enough. On the other hand, in case where the content is more than 50 weight %, there are disadvantages in that the dispersibility to cement is lowered.

As to the above polyalkylene glycol, its oxyalkylene group has fitly 2 to 18 carbon atoms, preferably 2 to 8 carbon atoms, more preferably 2 to 4 carbon atoms. Furthermore, it is necessary that the polyalkylene glycol be water-soluble. Therefore, a high hydrophilic oxyalkylene group having 2 carbon atoms, namely, an oxyethylene group is preferably included essentially at least, and the oxyethylene group of not less than 90 mol % is more preferably included. In addition, the repeating unit of the oxyalkylene group may be identical or different. If the oxyalkylene group is a mixture of two or more thereof, the repeating unit may be in any addition state, such as block addition, random addition, or alternating addition. In addition, the terminal group of the polyalkylene glycol is fitly a hydrogen atom, an alkyl group or an (alkyl)phenyl group having 1 to 30 carbon atoms, and it is preferably a hydrogen atom. In addition, the average molecular weight of the polyalkylene glycol is preferably in the range of 500 to 200,000, more preferably 1,000 to 100,000, still more preferably 2,000 to 50,000.

Examples of the polyalkylene glycol include: polyethylene glycol, polypropylene glycol, polyethylene polypropylene glycol, and polyethylene polybutylene glycol. It is necessary that the polyalkylene glycol be water-soluble. Therefore, the polyethylene glycol or polyethylene polypropylene glycol including a high hydrophilic oxyethylene group as an essential component is preferable, and the polyethylene glycol is the most preferable.

For examples, the cement dispersant further comprising the above polyalkylene glycol can easily be obtained by using comonomers including unsaturated (poly)alkylene glycol ether monomer (a1) or (a2) which includes a polyalkylene glycol as an impurity. The above unsaturated (poly)alkylene glycol ether monomer (a1) or (a2) can be obtained by adding an alkylene oxide to an unsaturated alcohol such as allyl alcohol, methallyl alcohol, and 3-buten-1-ol. When this addition reaction is carried out and the reaction system includes a compound having active hydrogen, such as a saturated alcohol other than the above unsaturated alcohol (for example, methanol and ethanol), and water, a polyalkylene glycol may be side-produced in addition to the aimed unsaturated (poly)alkylene glycol ether monomer. The simplification of purifying process can be carried out by not removing this side-produced polyalkylene glycol and using a product obtained by the addition reaction as it is, as a raw material. At the same time, the cement dispersant as obtained comprises the copolymer and the polyalkylene glycol, and can further improve workability of mortar or concrete before hardening.

The content of the polyalkylene glycol contained as the impurity is fitly 0.5 to 50 weight %, preferably 1 to 40 weight %, more preferably 2 to 30 weight %, still more preferably 3 to 20 weight %, of the unsaturated (poly)alkylene glycol ether monomer. In case where the content of the polyalkylene glycol is more than 50 weight %, there are disadvantages in that the concentration of the monomers are lowered and the polymerization ratio tends to be lowered when carrying out the polymerization.

The cement dispersant, according to the present invention, comprises the above unsaturated (poly)alkylene glycol ether monomer (a1) or (a2) preferably in the range of 1 to 100 weight %, more preferably 2 to 100 weight %, still more preferably 3 to 90 weight %, particularly preferably 5 to 80 weight %, of the copolymer, other than the above copolymers (i) to (iv). The dispersant can further improve workability of mortar or concrete because of further comprising unsaturated (poly)alkylene glycol ether monomer (a1) or (a2). In case where the content of unsaturated (poly)alkylene glycol ether monomer (a1) or (a2) is less than 1 weight %, the effects of improving workability of mortar or concrete are not enough. On the other hand, in case where the content is more than 100 weight %, there are disadvantages in that the dispersibility to cement is lowered.

The cement dispersant further comprising the above unsaturated (poly)alkylene glycol ether monomer (a1) or (a2) can easily be obtained by stopping the polymerization reaction at the time when the amount of unreacted unsaturated (poly)alkylene glycol ether monomer (a1) or (a2) is 1 to 100 weight % of the produced copolymer when the copolymerization is carried out to obtain the above copolymer (i) to (iv). Accordingly, the resultant product comprises unsaturated (poly)alkylene glycol ether monomer (a1) or (a2) in addition to the copolymer, and can display excellent dispersibility. The time when the polymerization reaction is stopped may be the time when the residual amount of unsaturated (poly)alkylene glycol ether monomer (a1) or (a2) is preferably in the range of 2 to 80 weight %, more preferably 3 to 70 weight %, still more preferably 5 to 60 weight %, of the copolymer. In case where the polymerization reaction is stopped at the time when the residual amount of unsaturated (poly)alkylene glycol ether monomer (a1) or (a2) is less than 1 weight % of the copolymer, the effects of improving workability of mortar or concrete are not enough. On the other hand, in case where the polymerization reaction is stopped at the time when the residual amount is more than 100 weight %, there are disadvantages in that the dispersibility to cement is lowered.

The most preferred mode of the cement dispersant according to the present invention is to comprise the above polyalkylene glycol and the above unsaturated (poly)alkylene glycol ether monomer (a1) or (a2) together in the above ratio. The dispersant is extremely excellent in workability of mortar or concrete because of comprising both these components.

The cement dispersant, according to the present invention, can be used for various hydraulic materials, namely, cement, or hydraulic materials other than cement, such as gypsum.

Then, examples of the hydraulic composition comprising the hydraulic material, water and the cement dispersant according to the present invention, and if necessary, further comprising fine aggregates (for example, sands) or coarse aggregates (for example, crushed stones) include cement paste, mortar, concrete and plaster.

Among the above exemplified hydraulic compositions, a cement composition comprising cement as a hydraulic material is the most general. Such the cement composition, according to the present invention, comprises: the cement dispersant according to the present invention, cement, and water as essential components.

The cement as used in the cement composition is not especially limited. Examples thereof include portland cement (such as standard types, high-early-strength types, ultra-high-early-strength types, moderate heat types, sulfate-resistant types and low alkali types thereof); various mixed cement (such as blast furnace cement, silica cement and fly ash cement); white portland cement; alumina cement; ultra rapid hardening cement (such as 1 clinker rapid hardening cement, 2 clinker rapid hardening cement and magnesium phosphate cement); grout cement; oil-well cement; low calorific cement (low-calorific type blast furnace cement, fly ash mixed low-calorific type blast furnace cement and much belite containing cement); ultra-high strength cement; cement type solidifiers; and ecological cement (such as cement produced from at least one raw material selected from the group consisting of ash from an urban garbage furnace and ash from an sewage garbage furnace). in addition, fine powder such as blast furnace slag, fly ash, cinder ash, clinker ash, husk ash, silica fume, silica powder and limestone powder; or gypsum can be added. In addition, refractory aggregates such as silica, clay, zircon, high alumina, silicon carbide, carbon, chromate, chrome magnesite and magnesia, can be used as the aggregates, other than gravel, cracked stones, water-granulated slag and recycled aggregates.

In the cement composition according to the present invention, there is no especial limitation with regard to the unit water amount and the amount of cement as used per 1 $m^3$, and the ratio of water/cement. The unit water amount of 100 to 185 $kg/m^3$, preferably 120 to 175 $kg/m^3$, and the amount of cement as used of 250 to 800 $kg/m^3$, preferably 270 to 800 $kg/m^3$, and the ratio of water/cement (weight ratio) of 0.1 to 0.7, preferably 0.2 to 0.65 are recommended. The above amount and ratio can be applied to broad range such as a little to much combination, and is effective to both high strength concrete having much unit cement amount and a little combining concrete having the unit cement amount of 300 $kg/m^3$ or less.

In the cement composition according to the present invention, the ratio of the cement dispersant according to the present invention is not especially limited, but when the cement dispersant is used for mortar or concrete containing hydraulic cement, the cement dispersant may be added in an amount that adjusts the ratio of 0.01 to 10 weight %, preferably 0.02 to 5 weight %, more preferably 0.05 to 3 weight %, of the weight of the cement. Preferred various effects such as reducing the unit water amount, increasing strength and improving durability can be caused by adding the cement dispersant. In case where the ratio is less than 0.01 weight %, it is not sufficient to the performance. On the other hand, even if the cement dispersant is used much with the ratio of more than 10 weight %, the effects substantially reaches the uppermost limit and it is disadvantageous in view of economy.

In addition, the cement composition, according to the present invention, is effective to concrete for secondary concrete product, centrifugal molded concrete, vibrational tightened concrete, steam cured concrete and spraying concrete. Furthermore, the cement composition is also effective to mortar and concrete necessary to have high fluidity, such as high flowing concrete, self-filing concrete and self-leveling agents.

The cement composition, according to the present invention, may comprise a conventional cement dispersant. The conventional cement dispersant that can be used, is not especially limited, but examples thereof include various sulfonic acid dispersants having a sulfonic acid group in the molecules and various polycarboxylic acid dispersants having a polyoxyalkylene chain and a carboxylic acid group in the molecules. Examples of the various sulfonic acid dispersants include: ligninsulfonic acid salts; polyol derivatives; naphthalenesulfonic acid-formalin condensation products; melaminesulfonic acid-formalin condensation products; polystyrenesulfonic acid salts; and aminosulfonic compounds, such as aminoarylsulfonic acid-phenol-formaldehyde condensation products. In addition, examples of the various polycarboxylic acid dispersants include: a copolymer obtained by copolymerizing comonomers including a polyalkylene glycol mono(meth)acrylic acid ester monomer having a polyoxyalkylene chain obtained by adding an alkylene oxide with 2 to 18 carbon atoms with the average addition number of moles of 2 to 300, and a (meth)acrylic acid monomer as essential components; a copolymer obtained by copolymerizing comonomers including three kinds of monomers consisting of a polyalkylene glycol mono(meth)acrylic acid ester monomer having a polyoxyalkylene chain obtained by adding an alkylene oxide with 2 to 3 carbon atoms with the average addition number of moles of 2 to 300, a (meth)acrylic acid monomer, and (meth)acrylic acid alkyl ester as essential components; a copolymer obtained by copolymerizing comonomers including three kinds of monomers consisting of a polyalkylene glycol mono(meth)acrylic acid ester monomer having a polyoxyalkylene chain obtained by adding an alkylene oxide with 2 to 3 carbon atoms with the average addition number of moles of 2 to 300, a (meth)acrylic acid monomer, and (meth)allylsulfonic acid (salts thereof) (or, either vinylsulfonic acid (salts thereof) or p-(meth)allyloxybenzenesulfonic acid (salts thereof)) as essential components; a grafted copolymer obtained by copolymerizing comonomers including three kinds of monomers consisting of a polyalkylene glycol mono(meth)acrylic acid ester monomer having a polyoxyalkylene chain obtained by adding ethylene oxide with the average addition number of moles of 2 to 50, a (meth)acrylic acid monomer, and (meth)allylsulfonic acid as essential component to obtain a copolymer, and further graft polymerizing the copolymer with (meth)acrylamide and/or 2-(meth)acrylamido-2-methylpropanesulfonic acid; a copolymer obtained by copolymerizing comonomers including four kinds of monomers consisting of a polyethylene glycol mono(meth)acrylic acid ester monomer having a polyoxyalkylene chain obtained by adding ethylene oxide with the average addition number of moles of 5 to 50, a polyethylene glycol mono(meth)allyl ether monomer having a polyoxyalkylene chain obtained by adding ethylene oxide with the average addition number of moles of 1 to 30, a (meth)acrylic acid monomer, and (meth)allylsulfonic acid (salts thereof) (or p-(meth)allyloxybenzenesulfonic acid (salts thereof)) as essential components; a copolymer obtained by copolymerizing comonomers including a polyalkylene glycol mono(meth)allyl ether monomer having a polyoxyalkylene chain obtained by adding an alkylene oxide with 2 to 18 carbon atoms with the average addition number of moles of 2 to 300, and a maleic acid monomer as essential components; a copolymer obtained by copolymerizing comonomers including a polyalkylene glycol mono(meth)allyl ether monomer having a polyoxyalkylene chain obtained by adding an alkylene oxide with 2 to 4 carbon atoms with the average addition number of moles of 2 to 300, and a polyalkylene glycol maleic acid ester monomer as essential components; and a copolymer obtained by copolymerizing comonomers including a polyalkylene glycol 3-methyl-3-butenyl ether monomer having a polyoxyalkylene chain obtained by adding an alkylene oxide with 2 to 4 carbon atoms with the average addition number of moles of 2 to 300, and a maleic acid monomer as essential components. These conventional cement dispersants can be jointly used in plural.

Incidentally, when the above conventional cement dispersant is jointly used, the mixing ratio by weight of the present invention dispersant to the conventional cement dispersant is in the range of (5 to 95): (95 to 5), preferably (10 to 90):(90 to 10), though not uniformly determinable, because of depending on differences in factors such as kind of the conventional cement dispersant as used, composition, and test conditions.

Furthermore, the cement composition according to the present invention can comprise other conventional cement additives (materials to add to cement) (1) to (20) as exemplified below:

(1) water-soluble high-molecular substances, for example: unsaturated carboxylic acid polymers such as poly(acrylic acid) (or its sodium salt), poly(methacrylic acid) (or its sodium salt), poly(maleic acid) (or its sodium salt), and sodium salts of acrylic acid-maleic acid copolymers; nonionic cellulose ethers such as methyl cellulose, ethyl cellulose, hydroxymethyl cellulose, hydroxyethyl cellulose, carboxymethyl cellulose, carboxyethyl cellulose, and hydroxypropyl cellulose; polysaccharide derivatives, of which a portion or the entirety of hydrogen atoms of alkylated or hydroxyalkylated polysaccharides such as methyl cellulose, ethyl cellulose, and hydroxypropyl cellulose is replaced with a hydrophobic substituent having a hydrocarbon chain with 8 to 40 carbon atoms as a partial structure and an ionic hydrophilic substituent including a sulfonic acid group or a salt thereof as a partial structure; polysaccharides produced by microbiological fermentation such as yeast glucan, xanthane gum, and β-1.3 glucans (which may be either a linear or branched chain type and of which examples include curdlan, paramylon, pacciman, scleroglucan and laminaran); polyacrylamide; polyvinyl alcohol; starch; starch phosphate; sodium alginate; gelatin; and acrylic acid copolymers having an amino group in their molecules and their quaternized compounds;

(2) high-molecular emulsions, for example: copolymers of various vinyl monomers such as alkyl (meth) acrylates;

(3) retarders, for example: oxycarboxylic acids such as gluconic acid, glucoheptonic acid, arabonic acid, malic acid or citric acid, and their inorganic or organic salts of sodium, potassium, calcium, magnesium, ammonium and triethanolamine; saccharides, for example, monosaccharides such as glucose, fructose, galactose, saccharose, xylose, apiose, ribose, and isomerized saccharides, or oligosaccharides such as disaccharides and trisaccharides, or oligosaccharides such as dextrin, or polysaccharides such as dextran, or molasses including them; sugar alcohols such as sorbitol; magnesium silicofluoride; phosphoric acid and its salts or borates; aminocarboxylic acids and its salts; alkali-soluble proteins; fumic acid; tannic acid; phenol; polyhydric alcohols such as glycerol; and phosphonic acids and derivatives thereof, such as aminotri(methylenephosphonic acid), 1-hydroxyethylidene-1,1-diphosphonic acid, ethylenediaminetetra(methylenephosphonic acid), diethylenetriaminepenta(methylenephosphonic acid), and their alkaline metal salts and alkaline earth metal salts;

(4) high-early-strength agents and promoters, for example: soluble calcium salts such as calcium chloride, calcium nitrite, calcium nitrate, calcium bromide, and calcium iodide; chlorides such as iron chloride and magnesium chloride; sulfates; potassium hydroxide; sodium hydroxide; carbonic acid salts; thiosulfates; formic acid and formates such as calcium formate; alkanol amines; alumina cement; and calcium aluminate silicate;

(5) mineral oil base defoaming agents, for example: kerosine and liquid paraffin;

(6) oils-and-fats base defoaming agents, for example: animal and plant oils, sesame oil, castor oil and their alkylene oxide adducts;

(7) fatty acid base defoaming agents, for example: oleic acid, stearic acid and their alkylene oxide adducts;

(8) fatty acid ester base defoaming agents, for example: glycerol monoricinolate, alkenyl succinic acid derivatives, sorbitol monolaurate, sorbitol trioleate, and natural wax;

(9) oxyalkylene base defoaming agents, for example: polyoxyalkylenes such as (poly)oxyethylene (poly) oxypropylene adducts; (poly)oxyalkyl ethers such as diethylene glycol heptyl ether, polyoxyethylene oleyl ether, polyoxypropylene butyl ether, polyoxyethylene polyoxypropylene 2-ethylhexyl ether, and adducts of oxyethylene oxypropylene to higher alcohols with 12 to 14 carbon atoms; (poly)oxyalkylene (alkyl) aryl ethers such as polyoxypropylene phenyl ether and polyoxyethylene nonyl phenyl ether; acetylene ethers as formed by addition polymerization of alkylene oxides to acetylene alcohols such as 2,4,7,9-tetramethyl-5-decyne-4,7-diol, 2,5-dimethyl-3-hexyne-2,5-diol, and 3-methyl-1-butyn-3-ol; (poly) oxyalkylene fatty acid esters such as diethylene glycol oleic acid ester, diethylene glycol lauric acid ester, and ethylene glycol distearic acid; (poly)oxyalkylene sorbitan fatty acid esters such as (poly)oxyethylene sorbitan monolauric acid ester and (poly)oxyethylene sorbitan trioleic acid ester; (poly)oxyalkylene alkyl (aryl) ether sulfuric acid ester salts such as sodium polyoxypropylene methyl ether sulfate, and sodium polyoxyethylene dodecylphenol ether sulfate; (poly) oxyalkylene alkyl phosphoric acid esters such as (poly) oxyethylene stearyl phosphate; (poly)oxyalkylene alkylamines such as polyoxyethylene laurylamine; and polyoxyalkylene amide;

(10) alcohol base defoaming agents, for example: octyl alcohol, hexadecyl alcohol, acetylene alcohol, and glycols;

(11) amide base defoaming agents, for example: acrylate polyamines;

(12) phosphoric acid ester base defoaming agents, for example: tributyl phosphate and sodium octyl phosphate;

(13) metal soap base defoaming agents, for example: aluminum stearate and calcium oleate;

(14) silicone base defoaming agents, for example: dimethyl silicone oils, silicone pastes, silicone emulsions, organic-denatured polysiloxanes (polyorganosiloxanes such as dimethyl polysiloxane), and fluorosilicone oils;

(15) AE agents, for example: resin soap, saturated or unsaturated fatty acids, sodium hydroxystearate, lauryl sulfate, ABS (alkylbenzenesulfonic acids), LAS (linear alkylbenzenesulfonic acids), alkanesulfonates, polyoxyethylene alkyl (phenyl) ethers, polyoxyethylene alkyl (phenyl) ether sulfuric acid esters or its salts, polyoxyethylene alkyl (phenyl) ether phosphoric acid esters or its salts, protein materials, alkenylsulfosuccinic acids, and α-olefinsulfonates;

(16) other surfactants, for example: polyalkylene oxide derivatives as formed by addition of 10 mol or more of alkylene oxides, such as ethylene oxide and propylene oxide, to aliphatic monohydric alcohols with 6 to 30 carbon atoms in the molecules, such as octadecyl alcohol and stearyl alcohol, or to alicyclic monohydric alcohols with 6 to 30 carbon atoms in the molecules, such as abiethyl alcohol, or to monovalent mercaptans with 6 to 30 carbon atoms in the molecules, such as dodecyl mercaptan, or to alkylphenols with 6 to 30 carbon atoms in the molecules, such as nonylphenol, or to amines with 6 to 30 carbon atoms in the molecules, such as dodecylamine, or to carboxylic acids with 6 to 30 carbon atoms in the molecules, such as lauric acid and stearic acid; alkyl diphenyl ether sulfonates as formed by ether-bonding of two phenyl groups having a sulfonic acid group, which may have an alkyl or alkoxy group as a substituent; various kinds of anionic surfactants; various kinds of cationic surfactants such as alkylamine acetate and alkyltrimethylammonium chloride; various kinds of nonionic surfactants; and various kinds of amphoteric surfactants;

(17) waterproofing agents, for example: fatty acids (or their salts), fatty acid esters, oils and fats, silicone, paraffin, asphalt, and wax;

(18) anticorrosives, for example: nitrous acid salts, phosphoric acid salts, and zinc oxide;

(19) fissure-reducing agents, for example: polyoxyalkyl ethers; and

(20) swelling materials, for example: ettringite base and coal base ones.

Examples of yet other conventional cement additives (materials to add to cement) include: cement humectants, thickeners, separation-decreasing agents, flocculants, dry-shrinkage-diminishing agents, strength-enhancing agents, self-levelling agents, anticorrosives, colorants, and mold-proofing agents. The above conventional cement additives (materials to add to cement) can be jointly used in plural.

In the cement composition according to the present invention, examples of especially preferable embodiments as to the components other than the cement and water include the following 1) to 7):

1) A combination comprising the following two essential components: (1) the cement dispersant according to the present invention and (2) the oxyalkylene base defoaming agent. Incidentally, the mixing weight ratio of (2) the oxyalkylene base defoaming agent is preferably in the range of 0.01 to 10 weight % of (1) the cement dispersant.

2) A combination comprising the following three essential components: (1) the cement dispersant according to the present invention, (2) the copolymer obtained by copolymerizing comonomers including a polyalkylene glycol mono(meth)acrylic acid ester monomer having a polyoxyalkylene chain obtained by adding an alkylene oxide with 2 to 18 carbon atoms with the average addition number of moles of 2 to 300 and a (meth) acrylic acid monomer (refer to JP-B-18338/1984, JP-A-223852/1995, and JP-A-241056/1997), and (3) the oxyalkylene base defoaming agent. Incidentally, the mixing weight ratio of (1) the cement dispersant to (2) the copolymer is preferably in the range of (5 to 95):(95 to 5), more preferably (10 to 90):(90 to 10). Incidentally, the mixing weight ratio of (3) the oxyalkylene base defoaming agent is preferably in the range of 0.01 to 10 weight % of the total of (1) the cement dispersant and (2) the copolymer.

3) A combination comprising the following two essential components: (1) the cement dispersant according to the present invention and (2) the sulfonic acid dispersant having a sulfonic acid group in the molecule. Examples of the sulfonic acid dispersant include: ligninsulfonic acid salts; naphthalenesulfonic acid-formalin condensation products; melaminesulfonic acid-formalin condensation products; polystyrenesulfonic acid salts; and aminosulfonic compounds, such as aminoarylsulfonic acid-phenol-formaldehyde condensation products. Incidentally, the mixing weight ratio of (1) the cement dispersant to (2) the sulfonic acid dispersant is preferably in the range of (5 to 95):(95 to 5), more preferably (10 to 90):(90 to 10).

4) A combination comprising the following two essential components: (1) the cement dispersant according to the present invention and (2) a ligninsulfonic acid salt. Incidentally, the mixing weight ratio of (1) the cement dispersant to (2) the ligninsulfonic acid salt is preferably in the range of (5 to 95):(95 to 5), more preferably (10 to 90):(90 to 10).

5) A combination comprising the following two essential components: (1) the cement dispersant according to the present invention and (2) a material separation-decreasing agent. Incidentally, examples of the material separation-decreasing agent that can be used include: various thickeners such as nonionic cellulose ethers, and a compound having a hydrophobic substituent having a hydrocarbon chain with 4 to 30 carbon atoms and a polyoxyalkylene chain obtained by adding an alkylene oxide with 2 to 18 carbon atoms with the average addition number of moles of 2 to 300 as partial structures. Incidentally, the mixing weight ratio of (1) the cement dispersant to (2) the material separation-decreasing agent is preferably in the range of (10 to 99.99):(90 to 0.01), more preferably (50 to 99.9):(50 to 0.1). The cement composition according to this combination is preferable as high flowing concrete, self-filing concrete and self-leveling agents.

6) A combination comprising the following two essential components: (1) the cement dispersant according to the present invention and (2) the retarder. Examples of the retarder that can be used include: oxycarboxylic acids such as gluconic acid (salt thereof) and citric acid (salt thereof), saccharides such as glucose, sugar alcohols such as sorbitol, and phosphoric acid such as aminotri (methylenephosphonic acid). Incidentally, the mixing weight ratio of (1) the cement dispersant to (2) the retarder is preferably in the range of (50 to 99.9):(50 to 0.1), more preferably (70 to 99):(30 to 1).

7) A combination comprising the following two essential components: (1) the cement dispersant according to the present invention and (2) the promoter. Examples of the promoter that can be used include: soluble calcium salts such as calcium chloride, calcium nitrite and calcium nitrate; chlorides such as iron chloride and magnesium chloride; thiosulfates; and formic acid and formates such as calcium formate. Incidentally, the mixing weight ratio of (1) the cement dispersant to (2) the promoter is preferably in the range of (10 to 99.9):(90 to 0.1), more preferably (20 to 99):(80 to 1).

(Effects and Advantages of the Invention)

The cement dispersant, according to the present invention, can display high dispersibility with a small addition amount and excellent dispersibility particularly even in a high water-reducing ratio area.

In addition, the cement composition comprising the cement dispersant, according to the present invention, displays excellent fluidity and can improve hindrances when carrying out the execution.

DETAILED DESCRIPTION OF THE PREFERRED EMBODIMENTS

Hereinafter, the present invention is more specifically illustrated by the following examples of some preferred embodiments. However, the present invention is not limited thereto. Incidentally, in the examples, comparative example, and tables, unless otherwise noted, the units "part(s)" and "%" denote those by weight.

In the production examples, the production amount of the side-produced polyalkylene glycol when producing the unsaturated polyalkylene glycol ether monomer is measured under the following condition.

| <Measurement condition of production amount of polyalkylene glycol> | |
|---|---|
| Instrument: | LC-10 made by Shimadzu |
| Detector: | RI detector (HITACHI 3350 RI MONITOR) |
| Eluent: kind: ion-exchanged water | |
| | flow rate: 1.5 ml/min |
| Columns: sort: | Shodex GF-130 (4.6 × 300 mm) made by Showa Denko Co., Ltd. |
| Temperature: | 40° C. |

The reaction ratio of each monomer and the weight-average molecular weight of the resultant copolymer in the examples and comparative examples were measured under the following condition.

| <Measurement condition of reaction ratio of each monomer> | |
|---|---|
| Instrument: | Borwin made by Nippon Bunko |
| Detector: | RI detector (HITACHI 3350 RI MONITOR) |
| Eluent: | kind: acetonitrile/aqueous solution containing phosphoric acid of 0.1% and ion-exchanged water = 50/50 (vol %) flow rate: 1.0 ml/min |
| Columns: sort: | ODS-120T + ODS-80Ts (4.6 × 250 mm each) made by Tosho Corporation |
| Temperature: | 40° C. |

| <Measurement condition of weight-average molecular weight of copolymer> | |
|---|---|
| Instrument: | Waters LCM1 |
| Detector: | RI detector (Waters 410) |
| Eluent: | kind: acetonitrile/aqueous solution containing sodium acetate of 0.05 M and ion-exchanged water = 40/60 (vol %), its pH was adjusted to 6.0 by acetic acid. flow rate: 0.6 ml/min |
| Columns: sort: | TSK-GEL G4000SWXL + G3000SWXL + G2000SWXL + GUARD COLUMN (7.8 × 300 mm and 6.0 × 40 mm each) made by Tosho Corporation |
| Temperature: | 40° C. |
| Calibration curve: | standardized by polyethylene glycols |

EXAMPLE 1-1

A glass reactor with a thermometer, a stirrer, a dropping funnel, and a reflux condenser was charged with 50.6 parts of ion-exchanged water and 158.6 parts of unsaturated alcohol (produced by an addition reaction of 50 mols of ethylene oxide to methallyl alcohol, as an unsaturated polyalkylene glycol ether monomer), and then they were heated to 65° C. Thereto, 0.8 parts of aqueous hydrogen peroxide solution of 30% was added. Then, a mixture of 21.4 parts of acrylic acid and 8.6 parts of ion-exchanged water, and a mixture of 0.78 parts of 3-mercaptopropionic acid and 29.2 parts of ion-exchanged water were separately added to the reactor over a period of 3 hours. At the same time, a mixture of 0.3 parts of L-ascorbic acid and 29.7 parts of ion-exchanged water was added to the reactor over a period of 3.5 hours. Thereafter, the temperature was subsequently kept at 65° C. for 60 minutes to complete a polymerization reaction, and the resultant reaction mixture was neutralized with an aqueous sodium hydroxide solution at not higher than the polymerization temperature (65° C.), thus obtaining cement dispersant (1-1) according to the present invention comprising an aqueous solution of a polymer with a weight-average molecular weight of 27,800.

EXAMPLES 1-2 AND 1-3, EXAMPLES 3-1 TO 3-3, COMPARATIVE EXAMPLES 1-1 TO 1-3, AND COMPARATIVE EXAMPLES 3-1 TO 3-3

Cement dispersants (1-2) and (1-3), and (3-1) to (3-3), and comparative cement dispersants (C1-1) to (C1-3) and (C3-1) to (C3-3) according to the present invention each comprising an aqueous solution of a polymer with a weight-average molecular weight listed in Table 1, were obtained in the same way as of Example 1-1 except for changing: the amount of the ion-exchanged water initially introduced; the kind and amount of the unsaturated polyalkylene glycol ether monomer, the amount of the maleic acid; the amount of the aqueous hydrogen peroxide solution of 30%; the amount of the acrylic acid and ion-exchanged water each in the mixture; the amount of the 3-mercaptopropionic acid and ion-exchanged water each in the mixture; the amount of the L-ascorbic acid and ion-exchanged water each in the mixture; and the polymerization reaction temperature (each temperature from adding the aqueous hydrogen peroxide solution of 30% to completing the polymerization reaction) in the way as shown in Table 1. Incidentally, the maleic acid was initially introduced together with the unsaturated polyalkylene glycol ether monomer.

TABLE 1

|  | Unsaturated polyalkylene glycol ether monomer | | Ion-exchanged water as initially introduced | Maleic acid | Acrylic acid | Dissolved ion-exchanged water | Aqueous hydrogen peroxide solution | 3-Mercapto propionic acid |
|---|---|---|---|---|---|---|---|---|
|  | Kind | Part | Part | Part | Part | Part | Part | Part |
| Example 1-1 | MAL-50EO | 158.6 | 50.6 | – | 21.4 | 8.6 | 0.8 | 0.78 |
| Example 1-2 | MAL-50EO | 159.1 | 40.1 | 10.2 | 10.8 | 19.2 | 0.7 | 0.33 |
| Example 1-3 | 3BL-50EO | 158.6 | 48.1 | – | 21.4 | 8.6 | 3.3 | 0.27 |
| Example 3-1 | AL-50EO | 165.9 | 41.7 | – | 14.1 | 15.9 | 2.4 | 0.20 |
| Example 3-2 | AL-75EO | 165.9 | 41.9 | – | 14.1 | 15.9 | 2.2 | 0.26 |
| Example 3-3 | AL-75EO | 166.2 | 35.2 | 6.7 | 7.1 | 22.9 | 1.9 | 0.11 |
| Comparative Example 1-1 | AL-25EO | 158.6 | 77.5 | – | 21.4 | 8.6 | 3.9 | – |
| Comparative Example 1-2 | MAL-50EO | 166.6 | 89.6 | 13.4 | – | – | 0.4 | – |
| Comparative Example 1-3 | 3BL-50EO | 159.6 | 87.8 | 20.4 | – | – | 2.2 | – |
| Comparative Example 3-1 | AL-50EO | 74.3 | 46.4 | – | 105.7 | – | 13.6 | 6.37 |
| Comparative Example 3-2 | AL-25EO | 165.9 | 71.0 | – | 14.1 | 15.9 | 3.1 | – |
| Comparative Example 3-3 | AL-50EO | 166.6 | 88.3 | 13.4 | – | – | 1.7 | – |

|  | Dissolved water Part | L-ascorbic acid Part | Dissolved ion-exchanged water Part | Polymerization reaction temperature °C. | Cement dispersant | Weight-average molecular weight |
|---|---|---|---|---|---|---|
| Example 1-1 | 29.2 | 0.3 | 29.7 | 65 | 1-1 | 27,800 |
| Example 1-2 | 29.7 | 0.3 | 29.7 | 65 | 1-2 | 29,100 |
| Example 1-3 | 29.7 | 1.3 | 28.7 | 80 | 1-3 | 30,300 |
| Example 3-1 | 29.8 | 1.0 | 29.0 | 80 | 3-1 | 32,700 |
| Example 3-2 | 29.7 | 0.9 | 29.1 | 80 | 3-2 | 30,300 |
| Example 3-3 | 29.9 | 0.7 | 29.3 | 80 | 3-3 | 28,100 |
| Comparative Example 1-1 | – | 1.5 | 28.5 | 80 | C1-1 | 19,700 |
| Comparative Example 1-2 | – | 0.2 | 29.8 | 65 | C1-2 | 31,100 |
| Comparative Example 1-3 | – | 0.9 | 29.1 | 60 | C1-3 | 19,800 |
| Comparative Example 3-1 | 23.6 | 5.3 | 24.7 | 80 | C3-1 | 29,600 |
| Comparative Example 3-2 | – | 1.2 | 28.8 | 80 | C3-2 | 20,300 |
| Comparative Example 3-3 | – | 0.7 | 29.3 | 60 | C3-3 | 21,700 |

Incidentally, the following abbreviations were used in Table 1.
MAL-50EO:
Unsaturated alcohol produced by an addition reaction of 50 mols of ethylene oxide to methallyl alcohol
3BL-50EO:
Unsaturated alcohol produced by an addition reaction of 50 mols of ethylene oxide to 3-buten-1-ol
AL-50EO:
Unsaturated alcohol produced by an addition reaction of 50 mols of ethylene oxide to allyl alcohol
AL-75EO:
Unsaturated alcohol produced by an addition reaction of 75 mols of ethylene oxide to allyl alcohol
AL-25EO:
Unsaturated alcohol produced by an addition reaction of 25 mols of ethylene oxide to allyl alcohol
(Measurement of Mortar Flow Value)
Mortar was prepared by use of the resultant cement dispersants (1-1) to (1-3) and (3-1) to (3-3) according to the present invention and comparative cement dispersants (C1-1) to (C1-3) and (C3-1) to (C3-3) in the above way, and then the following mortar test was carried out. Incidentally, the temperatures of all the materials as used in the mortar test were adjusted to 25° C. respectively, and the mortar test was carried out in an atmosphere of 25° C. The materials as used in the test and the combination thereof were shown in either below.

(Combination A) First, 800 g of normal portland cement (produced by Pacific Cement Co., Ltd.), 400 g of Toyoura standard sand, and 205 g of ion-exchanged water containing each cement dispersant (the weight ratio of water/cement is 0.256. Incidentally, the amount of the dispersant as added each (weight % of solid content of the dispersant to cement) was shown in Tables 2 and 3.

(Combination B) First, 600 g of normal portland cement (produced by Pacific Cement Co., Ltd.), 600 g of Toyoura standard sand, and 240 g of ion-exchanged water containing each cement dispersant (the weight ratio of water/cement is 0.400. Incidentally, the amount of the dispersant as added each (weight % of solid content of the dispersant to cement) was shown in Tables 2 and 3.

In the first place, only the cement and the sand were mixed for 30 seconds at a low speed by use of HOBART-type mortar mixer (made by HOBART Corporation, N-50). Then, the ion-exchanged water containing the cement dispersant was added thereto, and the resultant mixture was kneaded for 3 minutes at a middle speed, thus obtaining mortar.

The resultant mortar was filled into a hollow cylinder having 55 mm in both diameter and height and placed on a horizontal table. Five minutes passed after the kneading was started, and the cylinder was lifted in perpendicular. Then, the long and short diameters (mm) of the mortar as spread on a table were measured, and the average value thereof was regarded as the mortar flow value (mm). The results are shown in Tables 2 and 3.

Measurement of Hardening Time)

Cement paste was prepared by use of the resultant cement dispersants (3-1) to (3-3) according to the present invention and comparative cement dispersants (C3-1) to (C3-3) in the above way, and then the hardening time was measured by the following method. Incidentally, the measurement each was carried out in an atmosphere of 25° C. by use of the materials of which temperatures were adjusted to 25° C.

First, cement paste was prepared by kneading 1,000 g of normal portland cement (produced by Pacific Cement Co., Ltd.) and 256 g of ion-exchanged water containing 3 g of each cement dispersant in terms of solid content (the weight ratio of water/cement is 0.256) for 3 minutes at a middle speed by use of HOBART-type mortar mixer (made by HOBART Corporation, N-50).

The resultant cement paste was immediately added to a glass bottle in a capacity of 300 ml covered with a heat insulator, and a thermometer was fixed in the center of the cement paste to measure temperature changes of the cement paste with the passage of time. The necessary time from the beginning of kneading until reaching the highest temperature due to heat of hardening was regarded as the hardening time. The results are shown in Table 3.

TABLE 2

| Cement Dispersant | Combination | Amount of cement dispersant as added (%) | Mortar flow value (mm) |
|---|---|---|---|
| 1-1 | A | 0.20 | 163 |
| 1-2 | A | 0.20 | 147 |
| 1-3 | B | 0.18 | 169 |
| C1-1 | A | 0.20 | 59 |
| C1-2 | A | 0.20 | 70 |
| C1-3 | B | 0.18 | 71 |

From Table 2, it would be understood that the mortar obtained by adding: either comparative cement dispersant (C1-1) wherein an unsaturated polyalkylene glycol ether monomer having an alkenyl group with carbon atoms of 3 (allyl group) is used; or comparative cement dispersant (C1-2) or (C1-3) wherein an acrylic acid (salt) is not included as a monomer component, cannot give a sufficient mortar flow value. However, it would be understood that the mortar obtained by adding each cement dispersant according to the present invention gives a higher mortar flow value.

TABLE 3

| Cement Dispersant | Combination | Amount of cement dispersant as added (%) | Mortar flow value (mm) | Hardening time (hour) |
|---|---|---|---|---|
| 3-1 | A | 0.30 | 151 | 12.1 |
| 3-2 | A | 0.30 | 137 | 9.8 |
| 3-3 | A | 0.30 | 124 | 9.3 |

TABLE 3-continued

| Cement Dispersant | Combination | Amount of cement dispersant as added (%) | Mortar flow value (mm) | Hardening time (hour) |
|---|---|---|---|---|
| C3-1 | A | 0.30 | 59 | Impossible to measure |
| C3-2 | A | 0.30 | 80 | 12.3 |
| C3-3 | A | 0.30 | 71 | 12.6 |

From Table 3, it would be understood that the mortar obtained by adding: either comparative cement dispersant (C3-1) wherein the unsaturated monocarboxylic acid monomer accounts for more than 50 weight % of the entirety of the comonomers; comparative cement dispersant (C3-2) wherein the average addition number of moles of the oxyalkylene group is 25; or comparative cement dispersant (C3-3) wherein an acrylic acid (salt) is not included as a monomer component, cannot give a sufficient mortar flow value. However, it would be understood that the mortar obtained by adding each cement dispersant according to the present invention gives a higher mortar flow value. In addition, it would be understood that: the larger the average addition number of moles is, the faster the hardening time is, in comparison with cement dispersant (3-1) wherein the average addition number of moles of the oxyalkylene group is 50, and cement dispersants (3-2) and (3-3) wherein the number is 75 each.

(Production Example 1)

A stainless high-pressure reactor with a thermometer, a stirrer, a dropping funnel, and nitrogen and alkylene oxide introducing tubes was charged with 196 parts of methally alcohol (2-methyl-2-propen-1-ol) as an unsaturated alcohol, and 3.1 parts of sodium hydroxide as an addition reaction catalyst, and the atmosphere of the reactor was replaced with nitrogen while being stirred, and then the resultant mixture was heated to 150° C. in an atmosphere of nitrogen. Then, 6,310 parts of ethylene oxide was introduced to the reactor while the temperature was maintained at 150° C. under safe pressure, and the temperature was maintained until the completion of the addition reaction of the alkylene oxide. Then, the reaction was completed. The resultant reaction product (hereinafter, referred as M-1) included: an unsaturated polyalkylene glycol ether monomer (hereinafter, referred as MAL-50) produced by an addition reaction of average 50 mols of ethylene oxide to methallyl alcohol; and a polyalkylene glycol (polyethylene glycol) as a by-product. The production amount of the polyethylene glycol was 5.0% of the unsaturated polyalkylene glycol ether monomer.

(Production Examples 2 to 7)

The addition reaction of the alkylene oxide to the unsaturated alcohol was carried out in the same way as of Production Example 1 except that the kind and amount of the unsaturated alcohol, the sodium hydroxide as the addition reaction catalyst, and the alkylene oxide were changed in the way as shown in Table 4, thus obtaining reaction products (M-2) to (M-7) which included: unsaturated polyalkylene glycol ether monomers and polyalkylene glycols. Incidentally, all the addition reactions of the alkylene oxide were carried out at 150° C. When using two kinds of alkylene oxides, such as ethylene oxide and propylene oxide, the blocked adduct was obtained by carrying out an addition reaction of the entirety of the propylene oxide to the unsaturated alcohol in the first place, and thereafter, carrying out an addition reaction of the ethylene oxide in the second place. The production amount of the side-produced polyethylene glycol to the unsaturated polyalkylene glycol ether monomer in the reaction product as obtained was listed in Table 4.

exchanged water initially introduced; the kind and amount of the unsaturated polyalkylene glycol ether monomer; the

TABLE 4

| Production Example | Unsaturated polyalkylene glycol ether monomer | Unsaturated alcohol Kind | Unsaturated alcohol Amount (part) | Ethylene oxide Amount (part) | Ethylene oxide *1 | Propylene oxide Amount (part) | Propylene oxide *1 | Sodium hydroxide Amount (part) | Side-produced polyalkylene glycol Kind | Side-produced polyalkylene glycol Production amount (part) |
|---|---|---|---|---|---|---|---|---|---|---|
| 1 | MAL-50 | Methallyl alcohol | 196.0 | 6310 | 50 | – | – | 3.1 | Polyethylene glycol | 5.0 |
| 2 | MAL-75 | Methallyl alcohol | 131.0 | 6325 | 75 | – | – | 3.1 | Polyethylene glycol | 5.3 |
| 3 | MAL-100 | Methallyl alcohol | 98.0 | 6390 | 100 | – | – | 3.1 | Polyethylene glycol | 6.4 |
| 4 | MAL-200 | Methallyl alcohol | 49.0 | 6726 | 200 | – | – | 3.1 | Polyethylene glycol | 12.0 |
| 5 | MAL-70EO5PO | Methallyl alcohol | 70.0 | 3184 | 70 | 294 | 5 | 1.7 | Polyethylene polypropylene glycol | 5.5 |
| 6 | AL-50 | Allyl alcohol | 158.0 | 6154 | 50 | – | – | 3.1 | Polyethylene glycol | 2.5 |
| 7 | AL-75 | Allyl alcohol | 105.0 | 6195 | 75 | – | – | 3.1 | Polyethylene glycol | 3.2 |

*1: Average addition number of moles

EXAMPLE 1-4

A glass reactor with a thermometer, a stirrer, a dropping funnel, a nitrogen introducing tube, and a reflux condenser was charged with 279 parts of ion-exchanged water, 420 parts of reaction product (M-1) obtained in Production Example 1 as an unsaturated polyalkylene glycol ether monomer (including 400 parts of MAL-50 and 20 parts of polyethylene glycol), and then they were heated to 65° C. Thereto, an aqueous hydrogen peroxide solution comprising 0.734 parts of hydrogen peroxide and 13.94 parts of ion-exchanged water was added while the reactor was maintained at 65° C. The temperature was maintained at 65° C. for 30 minutes after the addition of the aqueous hydrogen peroxide solution. Thereafter, 65.0 parts of acrylic acid as an unsaturated monocarboxylic acid monomer was dropwise added to the reactor over a period of 3 hours. At the same time, an aqueous solution obtained by dissolving 0.950 parts of L-ascorbic acid and 1.718 parts of 3-mercaptopropionic acid in 18.05 parts of ion-exchanged water was dropwise added thereto over a period of 3.5 hours. Then, the temperature was maintained at 65° C. for one hour, and thereafter the polymerization reaction was finished. Incidentally, the concentration of the polymerization components (the concentration (weight %) of the entirety of the comonomers to the entirety of raw materials) was 60%. Thereafter, the resultant reaction solution was neutralized to pH 7 with an aqueous sodium hydroxide solution at not higher than the polymerization temperature, thus obtaining cement dispersant (1-4) according to the present invention.

The reaction ratio (%) of each starting monomer and the analytical results of the copolymer included in the resultant dispersant (combination ratio for copolymerization (%), amount of constitutional unit derived from unsaturated polyalkylene glycol ether monomer (mol %), amount of carboxylic acid in terms of unneutralized copolymer (meq/g), weight-average molecular weight, content of unsaturated polyalkylene glycol ether monomer to copolymer having neutralized form (%), and content of polyalkylene glycol to copolymer having neutralized form (%)) are listed in Table 6.

EXAMPLES 1-5 TO 1-9, EXAMPLES 2-1 TO 2-7, EXAMPLES 34 TO 3-6, AND EXAMPLES 4-1 TO 4-5

Cement dispersants (1-5) to (1-9), (2-1) to (2-7), (34) to (3-6), and (4to (4-5) were obtained in the same way as of Example 1-4, except for changing: the amount of the ion-exchanged water initially introduced; the kind and amount of the unsaturated polyalkylene glycol ether monomer; the amount of the hydrogen peroxide and ion-exchanged water each in the aqueous hydrogen peroxide solution; the kind and amount of the unsaturated monocarboxylic acid monomer, the kind and amount of the other monomer; the amount of the L-ascorbic acid, 3-mercaptopropionic acid, and ion-exchanged water for dissolving them; the concentration of the polymerization components (the concentration (weight %) of the entirety of the comonomers to the entirety of raw materials); and the polymerization reaction temperature (each temperature from after adding the initially introduced component to finishing the polymerization reaction) in the way as shown in Table 5. Incidentally, the other monomer was dropwise added together with the unsaturated monocarboxylic acid monomer over a period of 3 hours.

The reaction ratio (%) of each starting monomer and the analytical results of the copolymer included in the resultant dispersant are listed in Table 6.

COMPARATIVE EXAMPLE 2-1

A glass reactor with a thermometer, a stirrer, a dropping funnel, a nitrogen introducing tube, and a reflux condenser was charged with 1,110 parts of ion-exchanged water, and then the water were heated to 65° C. Thereto, an aqueous hydrogen peroxide solution comprising 0.839 parts of hydrogen peroxide and 15.94 parts of ion-exchanged water was added while the reactor was maintained at 65° C. The temperature was maintained at 65° C. for 30 minutes after the addition of the aqueous hydrogen peroxide solution. Thereafter, 98.5 parts of methacrylic acid, and a mixture of 200 parts of unsaturated polyalkylene glycol ether monomer (not including a polyalkylene glycol, and produced by an addition reaction of average 50 mols of ethylene oxide to methallyl alcohol) and 50.0 parts of ion-exchanged water were dropwise added to the reactor over a period of 3 hours. At the same time, an aqueous solution obtained by dissolving 1.086 parts of L-ascorbic acid and 0.655 parts of 3-mercaptopropionic acid in 20.64 parts of ion-exchanged water was dropwise added thereto over a period of 3.5 hours. Then, the temperature was maintained at 65° C. for one hour, and thereafter the polymerization reaction was finished. Incidentally, the concentration of the polymerization components (the concentration (weight %) of the entirety of the comonomers to the entirety of raw materials) was 20%. Thereafter, the resultant reaction solution was neutralized to pH 7 with an aqueous sodium hydroxide solution at not higher than the polymerization temperature, thus obtaining comparative cement dispersant (C2-1).

The reaction ratio (%) of each starting monomer and the analytical results of the copolymer included in the resultant dispersant are listed in Table 7.

COMPARATIVE EXAMPLE 2-2 AND
COMPARATIVE EXAMPLES 4-1 TO 4-2>

Comparative cement dispersants (C2-2), (C4-1), and (C4-2) were obtained in the same way as of Example 1-4, except for using an unsaturated polyalkylene glycol ether monomer (not including a polyalkylene glycol, produced by an addition reaction of average 25 mols of ethylene oxide and average 25 mols of propylene oxide to methallyl alcohol, and hereinafter referred as MAL-25EO25PO) in Comparative Example 2-2, an unsaturated polyalkylene glycol ether monomer (not including a polyalkylene glycol, produced by an addition reaction of average 25 mols of ethylene oxide to allyl alcohol, and hereinafter referred as AL-25) in Comparative Example 4-1, and an unsaturated polyalkylene glycol ether monomer (not including a polyalkylene glycol, produced by an addition reaction of average 20 mols of ethylene oxide and average 10 mols of propylene oxide to allyl alcohol, and hereinafter referred as AL-20EO10PO) in Comparative Example 4-2, respectively as the unsaturated polyalkylene glycol ether monomer, and except for changing: the amount of the unsaturated polyalkylene glycol ether monomer; the amount of the ion-exchanged water initially introduced; the amount each in the aqueous hydrogen peroxide solution; the kind and amount of the unsaturated monocarboxylic acid monomer; the kind and amount of the other monomer; the amount of the L-ascorbic acid, 3-mercaptopropionic acid, and ion-exchanged water for dissolving them; the concentration of the polymerization components (the concentration (weight %) of the entirety of the comonomers to the entirety of raw materials); and the polymerization reaction temperature (each temperature from after adding the initially introduced component to finishing the polymerization reaction) in the way as shown in Table 5.

The reaction ratio (%) of each starting monomer and the analytical results of the copolymer included in the resultant dispersant are listed in Table 7.

COMPARATIVE EXAMPLE 4-3

A glass reactor with a thermometer, a stirrer, a dropping funnel, a nitrogen introducing tube, and a reflux condenser was charged with 88.3 parts of ion-exchanged water, 166.6 parts unsaturated polyalkylene glycol ether monomer (not including a polyalkylene glycol, and produced by an addition reaction of average 50 mols of ethylene oxide to allyl alcohol), and 13.4 parts of maleic acid, and then they were heated to 65° C. Thereto, 1.7 parts of aqueous hydrogen peroxide solution of 30% was added while the reactor was maintained at 65° C. Next, an aqueous solution obtained by dissolving 0.7 parts of L-ascorbic acid in 29.3 parts of ion-exchanged water was dropwise added thereto over a period of 3.5 hours. Then, the temperature was maintained at 65° C. for one hour, and thereafter the polymerization reaction was finished. Incidentally, the concentration of the polymerization components (the concentration (weight %) of the entirety of the comonomers to the entirety of raw materials) was 60%. Thereafter, the resultant reaction solution was neutralized to pH 7 with an aqueous sodium hydroxide solution at not higher than the polymerization temperature, thus obtaining comparative cement dispersant (C4-3).

The reaction ratio (%) of each starting monomer and the analytical results of the copolymer included in the resultant dispersant are listed in Table 7.

TABLE 5

|  | Unsaturated polyalkylene glycol ether monomer | | Ion-exchanged water as initially introduced | Unsaturated monocarboxylic acid monomer | | | | Other monomer | | Hydrogen peroxide |
|---|---|---|---|---|---|---|---|---|---|---|
|  | Kind | Part | Part | Kind | Part | Kind | Part | Kind | Part | Part |
| Example 1-4 | M-1 | 420 | 279 | AA | 65.0 | – | 0.0 | – | 0.0 | 0.734 |
| Example 1-5 | M-2 | 421 | 275 | AA | 43.8 | – | 0.0 | – | 0.0 | 0.494 |
| Example 1-6 | M-3 | 426 | 277 | AA | 43.8 | – | 0.0 | – | 0.0 | 0.474 |
| Example 1-7 | M-4 | 448 | 282 | AA | 54.1 | – | 0.0 | – | 0.0 | 0.541 |
| Example 1-8 | M-5 | 422 | 275 | AA | 43.8 | – | 0.0 | – | 0.0 | 0.492 |
| Example 1-9 | M-1 | 420 | 282 | AA | 55.7 | – | 0.0 | HEA | 12.1 | 0.717 |
| Example 2-1 | M-1 | 420 | 280 | MAA | 56.2 | – | 0.0 | – | 0.0 | 0.564 |
| Example 2-2 | M-1 | 420 | 278 | AA | 27.0 | MAA | 28.1 | – | 0.0 | 0.597 |
| Example 2-3 | M-2 | 421 | 129 | MAA | 45.5 | – | 0.0 | – | 0.0 | 0.440 |
| Example 2-4 | M-3 | 426 | 121 | AA | 43.8 | MAA | 18.2 | – | 0.0 | 0.618 |
| Example 2-5 | M-4 | 448 | 115 | AA | 54.1 | MAA | 37.5 | – | 0.0 | 0.838 |
| Example 2-6 | M-1 | 420 | 285 | MAA | 57.9 | – | 0.0 | HEA | 12.1 | 0.649 |
| Example 2-7 | M-5 | 422 | 278 | MAA | 45.5 | – | 0.0 | – | 0.0 | 0.439 |
| Example 3-4 | M-6 | 410 | 166 | AA | 54.1 | – | 0.0 | – | 0.0 | 2.524 |
| Example 3-5 | M-7 | 413 | 168 | AA | 43.8 | – | 0.0 | – | 0.0 | 1.977 |
| Example 3-6 | M-7 | 413 | 170 | AA | 45.1 | – | 0.0 | HEA | 11.8 | 2.302 |
| Example 4-1 | M-6 | 410 | 88 | MAA | 56.2 | – | 0.0 | – | 0.0 | 2.257 |
| Example 4-2 | M-6 | 410 | 86 | AA | 36.0 | MAA | 18.7 | – | 0.0 | 2.433 |
| Example 4-3 | M-7 | 413 | 91 | MAA | 45.5 | – | 0.0 | – | 0.0 | 1.762 |
| Example 4-4 | M-7 | 413 | 85 | AA | 43.8 | MAA | 9.1 | – | 0.0 | 2.264 |
| Example 4-5 | M-7 | 413 | 88 | AA | 31.3 | MAA | 7.2 | HEA | 13.6 | 2.055 |
| Comparative Example 2-2 | MAL-25EO25PO | 200 | 916 | MAA | 32.3 | – | 0.0 | – | 0.0 | 0.307 |
| Comparative Example 4-1 | AL-25 | 200 | 897 | MAA | 28.1 | – | 0.0 | – | 0.0 | 1.353 |
| Comparative Example 4-2 | AL-20EO10PO | 200 | 898 | MAA | 28.1 | – | 0.0 | – | 0.0 | 1.244 |

TABLE 5-continued

|  | Dissolved ion-exchanged water Part | L-acsorbic acid Part | 3-Mercapto propionic acid Part | Dissolved ion-exchanged water Part | Concentration of polymerization components % | Polymerization reaction temperature ° C. |
|---|---|---|---|---|---|---|
| Example 1-4 | 13.94 | 0.950 | 1.718 | 18.05 | 60 | 65 |
| Example 1-5 | 9.39 | 0.640 | 1.774 | 12.16 | 60 | 65 |
| Example 1-6 | 9.01 | 0.614 | 2.221 | 11.67 | 60 | 65 |
| Example 1-7 | 10.28 | 0.701 | 4.901 | 13.32 | 60 | 65 |
| Example 1-8 | 9.36 | 0.638 | 1.537 | 12.12 | 60 | 65 |
| Example 1-9 | 13.62 | 0.928 | 2.238 | 17.64 | 60 | 65 |
| Example 2-1 | 10.72 | 0.731 | 0.000 | 13.88 | 60 | 65 |
| Example 2-2 | 11.35 | 0.773 | 0.932 | 14.70 | 60 | 65 |
| Example 2-3 | 8.37 | 0.570 | 0.000 | 10.84 | 75 | 65 |
| Example 2-4 | 11.74 | 0.801 | 0.965 | 15.21 | 75 | 65 |
| Example 2-5 | 15.91 | 1.085 | 0.654 | 20.61 | 75 | 65 |
| Example 2-6 | 12.33 | 0.840 | 0.000 | 15.96 | 60 | 65 |
| Example 2-7 | 8.34 | 0.568 | 0.000 | 10.80 | 60 | 65 |
| Example 3-4 | 10.10 | 3.269 | 0.985 | 18.53 | 70 | 80 |
| Example 3-5 | 7.91 | 2.561 | 0.772 | 14.51 | 70 | 80 |
| Example 3-6 | 9.21 | 2.981 | 0.898 | 16.89 | 70 | 80 |
| Example 4-1 | 9.03 | 2.923 | 0.000 | 16.56 | 80 | 80 |
| Example 4-2 | 9.73 | 3.151 | 0.475 | 17.86 | 80 | 80 |
| Example 4-3 | 7.05 | 2.282 | 0.000 | 12.93 | 80 | 80 |
| Example 4-4 | 9.06 | 2.932 | 0.442 | 16.61 | 80 | 80 |
| Example 4-5 | 8.22 | 2.662 | 0.401 | 15.08 | 80 | 80 |
| Comparative Example 2-2 | 5.84 | 0.398 | 0.000 | 7.56 | 20 | 65 |
| Comparative Example 4-1 | 5.41 | 1.752 | 0.000 | 9.93 | 20 | 80 |
| Comparative Example 4-2 | 4.98 | 1.611 | 0.000 | 9.13 | 20 | 80 |

TABLE 6

| Example/ cement dispersant | Reaction ratio of each monomer (%) AO/AA/MAA/other | Combination ratio of copolymer (%) AO/AA/MAA/other | Constitutional unit derived from AO mol % | Amount of carboxylic acid in terms of unneutralized copolymer meq/g | Weight-average molecular weight | Content of AO *1 % | Content of polyalkylene glycol *1 % |
|---|---|---|---|---|---|---|---|
| 1-4 | 94.1/97.0/0.0/0.0 | 85.65/14.35/0.0/0.0 | 15.9 | 1.992 | 31000 | 5.1 | 4.4 |
| 1-5 | 90.1/94.6/0.0/0.0 | 89.7/10.3/0.0/0.0 | 15.7 | 1.431 | 29200 | 9.6 | 5.1 |
| 1-6 | 92.6/94.8/0.0/0.0 | 89.93/10.07/0.0/0.0 | 12.6 | 1.399 | 30900 | 7.0 | 6.0 |
| 1-7 | 91.4/97.6/0.0/0.0 | 87.39/12.61/0.0/0.0 | 5.3 | 1.752 | 35800 | 7.9 | 11.0 |
| 1-8 | 88.7/95.3/0.0/0.0 | 89.48/10.52/0.0/0.0 | 15.1 | 1.461 | 32300 | 11.0 | 5.4 |
| 1-9 | 92.7/96.6/0.0/HEA 94.3 | 85.04/12.34/0.0/HEA 2.62 | 16.2 | 1.714 | 30100 | 6.5 | 4.4 |
| 2-1 | 56.6/0.0/97.4/0.0 | 80.5/0.0/19.9/0.0 | 13.5 | 2.264 | 31400 | 58.8 | 6.8 |
| 2-2 | 85.3/97.2/97.5/0.0 | 86.4/6.7/6.9/0.0 | 18.0 | 1.731 | 30800 | 14.3 | 4.9 |
| 2-3 | 57.5/0.0/97.7/0.0 | 83.8/0.0/16.2/0.0 | 11.7 | 1.833 | 34500 | 59.5 | 7.4 |
| 2-4 | 81.3/96.5/96.1/0.0 | 88.4/6.8/4.8/0.0 | 11.6 | 1.509 | 40200 | 19.7 | 6.7 |
| 2-5 | 70.5/97.3/97.0/0.0 | 84.0/5.2/10.8/0.0 | 4.6 | 1.983 | 52500 | 33.7 | 13.7 |
| 2-6 | 63.1/0.0/96.9/HEA 95.3 | 78.9/0.0/17.5/HEA 3.6 | 12.9 | 2.039 | 32600 | 44.1 | 6.0 |
| 2-7 | 53.3/0.0/97.3/0.0 | 82.8/0.0/17.2/0.0 | 10.7 | 1.999 | 33000 | 69.5 | 8.2 |
| 3-4 | 65.0/97.8/0.0/0.0 | 83.1/16.9/0.0/0.0 | 13.6 | 2.347 | 33000 | 42.5 | 3.0 |
| 3-5 | 62.0/97.0/0.0/0.0 | 85.38/14.62/0.0/0.0 | 11.1 | 2.030 | 36500 | 50.1 | 4.2 |
| 3-6 | 64.0/97.5/0.0/HEA 95.0 | 82.29/14.12/0.0/HEA 3.59 | 9.7 | 1.961 | 33800 | 44.4 | 3.9 |
| 4-1 | 48.0/0.0/97.5/0.0 | 77.8/0.0/22.2/0.0 | 11.8 | 2.582 | 27000 | 79.7 | 3.8 |
| 4-2 | 58.0/98.0/97.8/0.0 | 81.2/12.4/6.4/0.0 | 12.7 | 2.463 | 31500 | 55.8 | 3.3 |
| 4-3 | 44.0/0.0/97.6/0.0 | 79.9/0.0/20.1/0.0 | 9.2 | 2.343 | 33500 | 96.6 | 5.5 |
| 4-4 | 54.5/97.8/97.5/0.0 | 83.5/13.1/3.4/0.0 | 10.1 | 2.217 | 37000 | 66.5 | 4.7 |
| 4-5 | 55.0/97.0/97.4/HEA 98.0 | 83.3/8.9/2.7/HEA 5.1 | 11.1 | 1.554 | 38500 | 65.9 | 4.7 |

*1:Each content means the content to the neutralized copolymer.

TABLE 7

| Example/ cement dispersant | Reaction ratio of each monomer (%) AO/AA/MAA/other | Combination ratio of copolymer (%) AO/AA/MAA/other | Constitutional unit derived from AO mol % | Amount of carboxylic acid in terms of unneutralized copolymer meq/g | Weight-average molecular weight | Content of AO *1 % | Content of polyalkylene glycol *1 % |
|---|---|---|---|---|---|---|---|
| C2-1 | 24.0/0.0/94.5/0.0 | 63.3/0.0/36.7/0.0 | 4.2 | 7.303 | 27500 | 101.5 | 0.0 |
| C2-2 | 40.5//0.09/93.8/0.0 | 79.2/0.0/20.8/0.0 | 9.2 | 2.855 | 26000 | 104.3 | 0.0 |
| C4-1 | 23.0/0.0/94/0/0.0 | 78.4/0.0/21.6/0.0 | 11.5 | 4.242 | 19000 | 194.5 | 0.0 |
| C4-2 | 21.0/0.0/93.0/0.0 | 77.8/0.0/22.2/0.0 | 8.3 | 4.460 | 18000 | 211.2 | 0.0 |
| C4-3 | 78.0/0.0/0.0/MA 90.0 | 91.5/0.0/0.0/MA 8.5 | 35.6 | 1.466 | 20400 | 25 | 0.0 |

*1:Each content means the content to the neutralized copolymer.

Incidentally, the following abbreviations were used in Tables 6 and 7.
AO: Unsaturated polyalkylene glycol ether monomer
AA: Acrylic acid
MAA: Methacrylic acid
HEA: 2-Hydroxyethylacrylate
MA: Maleic acid (Concrete Test)

A concrete composition was produced by using cement dispersants (1-4) to (1-9), (2-1) to (2-7), (3-4) to (3-6), and (4-1) to (4-5 invention, and comparative cement dispersants (C2-1) to (C2-2), and (C4-1) to (C4-3) as obtained in the above way, and then measured by the slump flow value change with the passage of time, the air content, and the kneading time. The results are listed in Table 8.

The concrete composition was prepared in the following way, First, 645.3 kg/m³ of fine aggregate (sand blend of land sand from Oi River System) was kneaded for 10 seconds with a forcible pan-type mixer in a capacity of 50 liters, and thereafter 660 kg/m³ of cement (normal portland cement produced by Pacific cement Co., Ltd.) was added thereto and kneaded for 10 seconds. Then, 165 kg/M³ of tap water containing a cement dispersant was added thereto and kneaded for 90 seconds, wherein the amount of the cement dispersant was adjusted so that the initial slump flow value would be 600±50 mm. However, when the composition took more than 60 seconds to become uniform, it was further kneaded for 30 seconds from the point time when it became uniform. Then, 941.3 kg/m³ of coarse aggregate (crushed stone from Oume) was added thereto and kneaded for 90 seconds, thus obtaining a concrete composition. Incidentally, the air content was adjusted to 1.0 ±0.3 vol % by use of a commercial oxyalkylene based defoaming agent to avoid that bubbles in the concrete composition had an influence on the fluidity of the concrete composition. Incidentally, the ratio of water/cement was 0.25 (weight ratio), and the ratio of the fine aggregate (fine aggregate/(fine aggregate+coarse aggregate)) was 0.403 (volume ratio). The amount of the used cement dispersant to the cement (the solid content (nonvolatile content) in the cement dispersant to the cement, weight %) and the amount of the copolymer in the cement dispersant to the cement (weight %) are listed in Table 8. Incidentally, the solid content (nonvolatile content) in the cement dispersant was measured by heat-drying a proper amount of the cement dispersant at 130° C., and removing the volatile content, and the dispersant was weighed so that the predetermined amount of the solid content (nonvolatile content) would be contained when combining with the cement, and then used.

1) The slump flow value change with the passage of time was measured according to JIS-A-1101.

2) The air content was measured according to JIS-A-1128.

3) The necessary time for kneading from adding the tap water and the cement dispersant until adding the coarse aggregate was regarded as the kneading time when the concrete composition was prepared.

(Measurement of Hardening Time)

Cement paste was prepared by use of the resultant cement dispersants (1-4) to (1-9), (2-1) to (2-7), (3-4) to (3-6) and (4-1) to (4-5 invention and comparative cement dispersants (C2-1) to (C2-2) and (C4-1) to (C4-3) in the above way, and then the hardening time was measured by the following method. The results are shown in Table 8.

Cement paste was prepared by kneading 1,500 g of normal portland cement (produced by Pacific Cement Co., Ltd.) and 375 g of ion-exchanged water containing the cement dispersant (the weight ratio of water/cement is 0.25) for 5 minutes at a middle speed by use of HOBART-type mortar mixer (made by HOBART Corporation, N-50). Incidentally, the amount of the used cement dispersant to the cement (the solid content (nonvolatile content) in the cement dispersant to the cement, weight %) was adjusted to the amount to obtain a slump flow value of 600±50 mm in the above concrete test.

The resultant cement paste was immediately added to a glass bottle in a capacity of 1,000 ml covered with a heat insulator, and a thermometer connected to a temperature recorder was fixed in the center of the cement paste to measure temperature changes of the cement paste with the passage of time. The necessary time from the beginning of kneading until reaching the highest temperature due to heat of hardening the cement paste was regarded as the hardening time. The results are shown in Table 8.

TABLE 8

| Cement dispersant | Ratio of copolymer/ cement (%) | Ratio of dispersant as used/cement (%) | Slump flow value (mm) | | Air content (vol %) | Kneading time (second) | Hardening time (second) |
|---|---|---|---|---|---|---|---|
| | | | After 5 minutes | After 30 minutes | | | |
| 1-4 | 0.183 | 0.200 | 635 | 417 | 0.9 | 120 | 6 |
| 1-5 | 0.161 | 0.185 | 565 | 340 | 0.8 | 190 | 6 |
| 1-6 | 0.168 | 0.190 | 583 | 300 | 0.9 | 170 | 5.5 |
| 1-7 | 0.210 | 0.250 | 568 | 355 | 1.1 | 170 | 6.5 |
| 1-8 | 0.189 | 0.220 | 620 | 405 | 0.7 | 200 | 6 |
| 1-9 | 0.189 | 0.210 | 588 | 375 | 0.8 | 160 | 5.5 |
| 2-1 | 0.160 | 0.265 | 565 | 310 | 1.3 | 190 | 7 |
| 2-2 | 0.189 | 0.225 | 605 | 445 | 1.0 | 170 | 6.5 |
| 2-3 | 0.162 | 0.270 | 580 | 347 | 0.9 | 200 | 6 |
| 2-4 | 0.182 | 0.230 | 590 | 430 | 0.8 | 180 | 5.5 |
| 2-5 | 0.170 | 0.250 | 585 | 465 | 1.1 | 160 | 6 |
| 2-6 | 0.170 | 0.255 | 570 | 330 | 1.2 | 190 | 6.5 |
| 2-7 | 0.158 | 0.280 | 600 | 360 | 0.9 | 200 | 6 |
| 3-4 | 0.188 | 0.270 | 620 | 350 | 0.9 | 170 | 7.5 |
| 3-5 | 0.171 | 0.260 | 605 | 310 | 1.2 | 190 | 6.5 |
| 3-6 | 0.170 | 0.250 | 590 | 300 | 0.8 | 200 | 6.5 |
| 4-1 | 0.180 | 0.330 | 570 | 290 | 1.1 | 160 | 8 |
| 4-2 | 0.189 | 0.300 | 595 | 310 | 0.9 | 140 | 8 |
| 4-3 | 0.173 | 0.350 | 565 | 300 | 0.8 | 150 | 7.5 |
| 4-4 | 0.175 | 0.300 | 585 | 320 | 1.2 | 130 | 7 |
| 4-5 | 0.191 | 0.325 | 590 | 380 | 1.0 | 180 | 6.5 |
| C2-1 | 0.347 | 0.700 | 580 | 200 | 1.1 | 90 | 16 |
| C2-2 | 0.245 | 0.500 | 570 | 220 | 0.8 | 100 | 11 |
| C4-1 | 0.238 | 0.700 | 600 | 220 | 1.1 | 90 | 13 |
| C4-2 | 0.225 | 0.700 | 580 | 210 | 0.8 | 90 | 12 |
| C4-3 | 0.360 | 0.450 | 565 | 320 | 1.2 | 300 | 10 |

From Table 8, it would be apparent that the hardening time is prolonged in case of using every comparative cement dispersant because the necessary amount to obtain a sufficient slump flow value is increased. In addition, it would be apparent that: the slump flow value change with the passage of time is enlarged, and the fluidity is extremely lowered when the kneading time is short. On the other hand, it would be apparent that: the kneading time is prolonged when the slump flow value change with the passage of time is comparatively small. In opposition to this, it would be apparent that the necessary amount to obtain a sufficient slump flow value is decreased, and the hardening time is short, and simultaneously, the slump flow value change with the passage of time is small, and the kneading time is short, in case of using every cement dispersant according to the present invention.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A cement composition, which comprises a cement dispersant, cement, and water as essential components, wherein the cement dispersant comprises a copolymer including: constitutional unit (I-1) derived from unsaturated (poly)alkylene glycol ether monomer (a1) as represented in general formula (1) below; and constitutional unit (II-1) derived from unsaturated monocarboxylic acid monomer (b1) as represented in general formula (2) below, as an essential component, wherein constitutional unit (II-1) includes at least one structure derived from an acrylic acid (salt), wherein general formula (1) is:

$$XO(R^1O)_nH \quad (1)$$

where: X represents an alkenyl group having 4 carbon atoms; $R^1O$ represents a mixture of one or more of an oxyalkylene group having 2 to 18 carbon atoms, and an oxyethylene group accounts for not less than 90 mol % of the entirety of the oxyalkylene groups; and n is an average addition number of moles and represents 1 to 300; and wherein general formula (2) is:

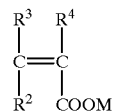

(2)

where: $R^2$, $R^3$, and $R^4$ each independently represent hydrogen or a methyl group; and M represents hydrogen, a monovalent metal, a divalent metal, an ammonium group, or an organic amine group.

2. A cement composition, which comprises a cement dispersant, cement, and water as essential components, wherein the cement dispersant comprises a copolymer including: constitutional unit (I-1) derived from unsaturated (poly)alkylene glycol ether monomer (a-1) as represented in general formula (1) below; and constitutional unit (II-2) derived from unsaturated monocarboxylic acid monomer (b2) as represented in general formula (3) below, as an essential component, with the cement dispersant being characterized in that constitutional unit (II-2) includes at least one structure derived from a methacrylic acid (salt), and that the milliequivalent of carboxyl groups in the copolymer is not more than 3.30 meq per 1 g of the copolymer when all the carboxyl groups are converted into their unneutralized form, wherein general formula (1) is:

$$XO(R^1O)_nH \quad (1)$$

where: X represents an alkenyl group having 4 carbon atoms; $R^1O$ represents a mixture of one or more of an oxyalkylene group having 2 to 18 carbon atoms, and an oxyethylene group accounts for not less than 90 mol % of the entirety of the oxyalkylene groups; and n is an average addition number of moles and represents 1 to 300; and wherein general formula (3) is:

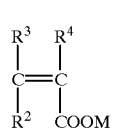

(3)

where: $R^2$, $R^3$, and $R^4$ each independently represent hydrogen or a methyl group; and M represents hydrogen, a monovalent metal, a divalent metal, an ammonium group, or an organic amine group.

3. A cement composition, according to claim 1, wherein constitutional unit (I-1) accounts for not more than 50 mol % of the entirety of the constitutional units.

4. A cement composition, according to claim 2, wherein constitutional unit (I-1) accounts for not more than 50 mol % of the entirety of the constitutional units.

5. A cement composition, which comprises a cement dispersant, cement, and water as essential components, wherein the cement dispersant comprises a copolymer including: constitutional unit (I-2) derived from unsaturated polyalkylene glycol ether monomer (a2) as represented in general formula (4) below; and constitutional unit (II-1) derived from unsaturated monocarboxylic acid monomer (b1) as represented in general formula (2) below, as an essential component, wherein constitutional unit (II-1) accounts for not more than 50 weight % of the entirety of the constitutional units, and includes at least one structure derived from an acrylic acid (salt), wherein general formula (4) is:

$$YO(R^1O)_mH \quad (4)$$

where: Y represents an alkenyl group having 2 or 3 carbon atoms; $R^1O$ represents a mixture of one or more of an oxyalkylene group having 2 to 18 carbon atoms, and an oxyethylene group accounts for not less than 90 mol % of the entirety of the oxyalkylene groups; and m is an average addition number of moles and represents 40 to 300; and wherein general formula (2) is:

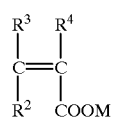

(2)

where: $R^2$, $R^3$, and $R^4$ each independently represent hydrogen or a methyl group; and M represents hydrogen, a monovalent metal, a divalent metal, an ammonium group, or an organic amine group.

6. A cement composition, which comprises a cement dispersant, cement, and water as essential components, wherein the cement dispersant comprises a copolymer including: constitutional unit (I-2) derived from unsaturated polyalkylene glycol ether monomer (a2) as represented in general formula (4) below; and constitutional unit (II-2) derived from unsaturated monocarboxylic acid monomer (b2) as represented in general formula (3) below, as an essential component, wherein constitutional unit (II-2) accounts for not more than 50 weight % of the entirety of the constitutional units, and includes at least one structure derived from a methacrylic acid (salt), wherein general formula (4) is:

$$YO(R^1O)_mH \quad (4)$$

where: Y represents an alkenyl group having 2 or 3 carbon atoms; $R^1O$ represents a mixture of one or more of an oxyalkylene group having 2 to 18 carbon atoms, and an oxyethylene group accounts for not less than 90 mol % of the entirety of the oxyalkylene groups; and m is an average addition number of moles and represents 40 to 300; and wherein general formula (3) is:

(3)

where: $R^1$, $R^3$, and $R^4$ each independently represent hydrogen or a methyl group; and M represents hydrogen, a monovalent metal, a divalent metal, an ammonium group, or an organic amine group.

7. A cement composition according to claim 1, wherein the cement dispersant further comprises the unsaturated (poly)alkylene glycol ether monomer (a1) in the range of 1 to 100 weight % of the copolymer.

8. A cement composition according to claim 2, wherein the cement dispersant further comprises the unsaturated (poly)alkylene glycol ether monomer (a1) in the range of 1 to 100 weight % of the copolymer.

9. A cement composition according to claim 3, wherein the cement dispersant further comprises the unsaturated (poly)alkylene glycol ether monomer (a1) in the range of 1 to 100 weight % of the copolymer.

10. A cement composition according to claim 4, wherein the cement dispersant further comprises the unsaturated (poly)alkylene glycol ether monomer (a1) in the range of 1 to 100 weight % of the copolymer.

11. A cement composition according to claim 5, wherein the cement dispersant further comprises the unsaturated polyalkylene glycol ether monomer (a2) in the range of 1 to 100 weight % of the copolymer.

12. A cement composition according to claim 6, wherein the cement dispersant further comprises the unsaturated polyalkylene glycol ether monomer (a2) in the range of 1 to 100 weight % of the copolymer.

13. A cement composition according to claim 2, wherein the cement dispersant further comprises a polyalkylene glycol in the range of 1 to 50 weight % of the copolymer.

14. A cement composition according to claim 3, wherein the cement dispersant further comprises a polyalkylene glycol in the range of 1 to 50 weight % of the copolymer.

15. A cement composition according to claim 4, wherein the cement dispersant further comprises a polyalkylene glycol in the range of 1 to 50 weight % of the copolymer.

16. A cement composition according to claim 5, wherein the cement dispersant further comprises a polyalkylene glycol in the range of 1 to 50 weight % of the copolymer.

17. A cement composition according to claim 6, wherein the cement dispersant further comprises a polyalkylene glycol in the range of 1 to 50 weight % of the copolymer.

18. A cement composition according to claim 7, wherein the cement dispersant further comprises a polyalkylene glycol in the range of 1 to 50 weight % of the copolymer.

19. A cement composition according to claim 8, wherein the cement dispersant further comprises a polyalkylene glycol in the range of 1 to 50 weight % of the copolymer.

20. A cement composition according to claim 9, wherein the cement dispersant further comprises a polyalkylene glycol in the range of 1 to 50 weight % of the copolymer.

21. A cement composition according to claim 10, wherein the cement dispersant further comprises a polyalkylene glycol in the range of 1 to 50 weight % of the copolymer.

22. A cement composition according to claim 11, wherein the cement dispersant further comprises a polyalkylene glycol in the range of 1 to 50 weight % of the copolymer.

23. A cement composition according to claim 12, wherein the cement dispersant further comprises a polyalkylene glycol in the range of 1 to 50 weight % of the copolymer.

* * * * *

UNITED STATES PATENT AND TRADEMARK OFFICE
CERTIFICATE OF CORRECTION

PATENT NO. : 6,569,234 B2
DATED : May 27, 2003
INVENTOR(S) : Akihiko Yamashita et al.

It is certified that error appears in the above-identified patent and that said Letters Patent is hereby corrected as shown below:

<u>Column 38,</u>
Line 33, "where: $R^1$, $R^3$, and $R^4$ each independently represent" should read
-- where: $R^2$, $R^3$, and $R^4$ each independently represent --.

Signed and Sealed this

Twenty-first Day of October, 2003

JAMES E. ROGAN
*Director of the United States Patent and Trademark Office*